US007501946B2

(12) United States Patent
Lanigan et al.

(10) Patent No.: US 7,501,946 B2
(45) Date of Patent: Mar. 10, 2009

(54) ELECTRONIC CONTROL SYSTEM USED IN SECURITY SYSTEM FOR CARGO TRAILERS

(76) Inventors: William P. Lanigan, 10738 Eagle Ridge Dr., Orland Park, IL (US) 60467; Maciej Labowicz, 785 Larson La., Roselle, IL (US) 60172; Harvey E. Schmidt, 3051 Scott Crescent, Flossmoor, IL (US) 60422; David S. Schuman, 415 Knoch Knolls Rd., Naperville, IL (US) 60565; Clark E. Smith, 155 W. Rickard Dr., Oswego, IL (US) 60543

( * ) Notice: Subject to any disclaimer, the term of this patent is extended or adjusted under 35 U.S.C. 154(b) by 239 days.

(21) Appl. No.: 11/445,745

(22) Filed: Jun. 2, 2006

(65) Prior Publication Data

US 2006/0220847 A1 Oct. 5, 2006

Related U.S. Application Data

(63) Continuation of application No. 10/777,876, filed on Feb. 12, 2004, now Pat. No. 7,091,857.

(51) Int. Cl.

| | |
|---|---|
| ***G08B 13/08*** | (2006.01) |
| ***G08B 13/00*** | (2006.01) |
| ***G06K 19/00*** | (2006.01) |
| ***H04L 9/14*** | (2006.01) |
| ***H04L 9/32*** | (2006.01) |

(52) U.S. Cl. ...................... 340/545.6; 340/541; 340/5.2

(58) Field of Classification Search ................ 340/541, 340/542, 545.6, 5.8, 5.81, 5.85, 5.2, 5.21, 340/5.22; 235/382, 380, 382.5

See application file for complete search history.

(56) References Cited

U.S. PATENT DOCUMENTS

| | | | | |
|---|---|---|---|---|
| 5,493,613 | A * | 2/1996 | Denno et al. | 705/73 |
| 5,933,087 | A * | 8/1999 | Wright et al. | 340/5.21 |
| 6,308,317 | B1 * | 10/2001 | Wilkinson et al. | 717/139 |
| 6,317,025 | B1 * | 11/2001 | Leon et al. | 340/5.21 |
| 6,420,971 | B1 * | 7/2002 | Leck et al. | 340/542 |
| 2003/0023954 | A1 * | 1/2003 | Wilkinson et al. | 717/118 |
| 2006/0145812 | A1 * | 7/2006 | Sajkowsky | 340/5.81 |

* cited by examiner

*Primary Examiner*—Toan N Pham
*Assistant Examiner*—Jennifer Mehmood

(57) ABSTRACT

A security system is provided for a cargo container having a door. An electronic control unit is provided for monitoring the locked status of the door. The electronic control unit is operably communicable with a remote computer terminal. A first software control program is located within the electronic control unit to monitor the locked status of the door. A second software control program is located within the remote computer terminal and is capable of retrieving activity and functions from the first software control program. A protocol is provided to facilitate communication between the electronic control unit and the remote computer terminal.

13 Claims, 21 Drawing Sheets

Fig. 4 Communication Protocol

FIG. 5 Data\Lock-Unlock screen – without ECU – PC communication

FIG. 6 Data\Lock-Unlock screen when ECU – PC communication is in progress

FIG. 7 Configure screen when ECU – PC communication is in progress

FIG. 8 Program RF key-fob screen when ECU – PC communication is in progress

FIG. 9 Firmware/Passwords screen when ECU – PC communication is in progress

FIG.10 Diagnostics screen when ECU – PC communication is in progress

FIG.11 Typical setup screen

Diagnostic Test screen

Interrupt Routine

Executed every 40 msec

Corrupted header correction

Fig. 16 Log Entries

Fig. 17 Software Licensing Password Locations

Note: If Administrator password is used, the ECU returns Access password to the PC Regular User
and
Administrator
Licensing
(no diagnostics)

PIL PASSWORDS w/o diagnostics

| FUNCTION | USER PASSWORD w/o license | ADM. PASSWORD w/o license | USER PASSWORD w/license | USER PASSWORD w/default license | ADM. PASSWORD w/license | DEF. ADM. PASSWORD w/default license |
|---|---|---|---|---|---|---|
| Open PC program | X | X | X | X | X | X |
| Configure com port | X | X | X | X | X | X |
| Install license file | X | X | X | X | X | X |
| Change user password | X | X* | X | X | X* | X* |
| Check ECU serial number | | | X | | X | |
| Check ECU firmware version | | | X | X | X | X |
| Check system status | | | X | X | X | X |
| Read system voltages | | | X | X | X | X |
| Read temperature | | | X | X | X | X |
| Check/modify configuration | | | X | X** | X | X** |
| Check/modify real time clock | | | X | X | X | X |
| Send software reset | | | X | X | X | X |
| Change ECU baud rate | | | X | X | X | X |
| Erase RF transmitter memory | | | X | X | X | X |
| Program RF transmitter | | | X | X | X | X |
| Lock and unlock | | | X | X | X | X |
| Retrieve log events | | | X | | X | |
| Export log events to .txt file | | | X | | X | |
| Change Access pwd (ECU & lic. file) | | | | | X | |
| Change Administrator password | | | | | X | |
| Save updated license to disk | | | | | X | |
| Update ECU firmware | | | | | X | X |

NOTE: default license is used when EEPROM memory is corrupted (default Access Password + S/N = 0)

X* - if user password is known
X** - read only

Fig. 19

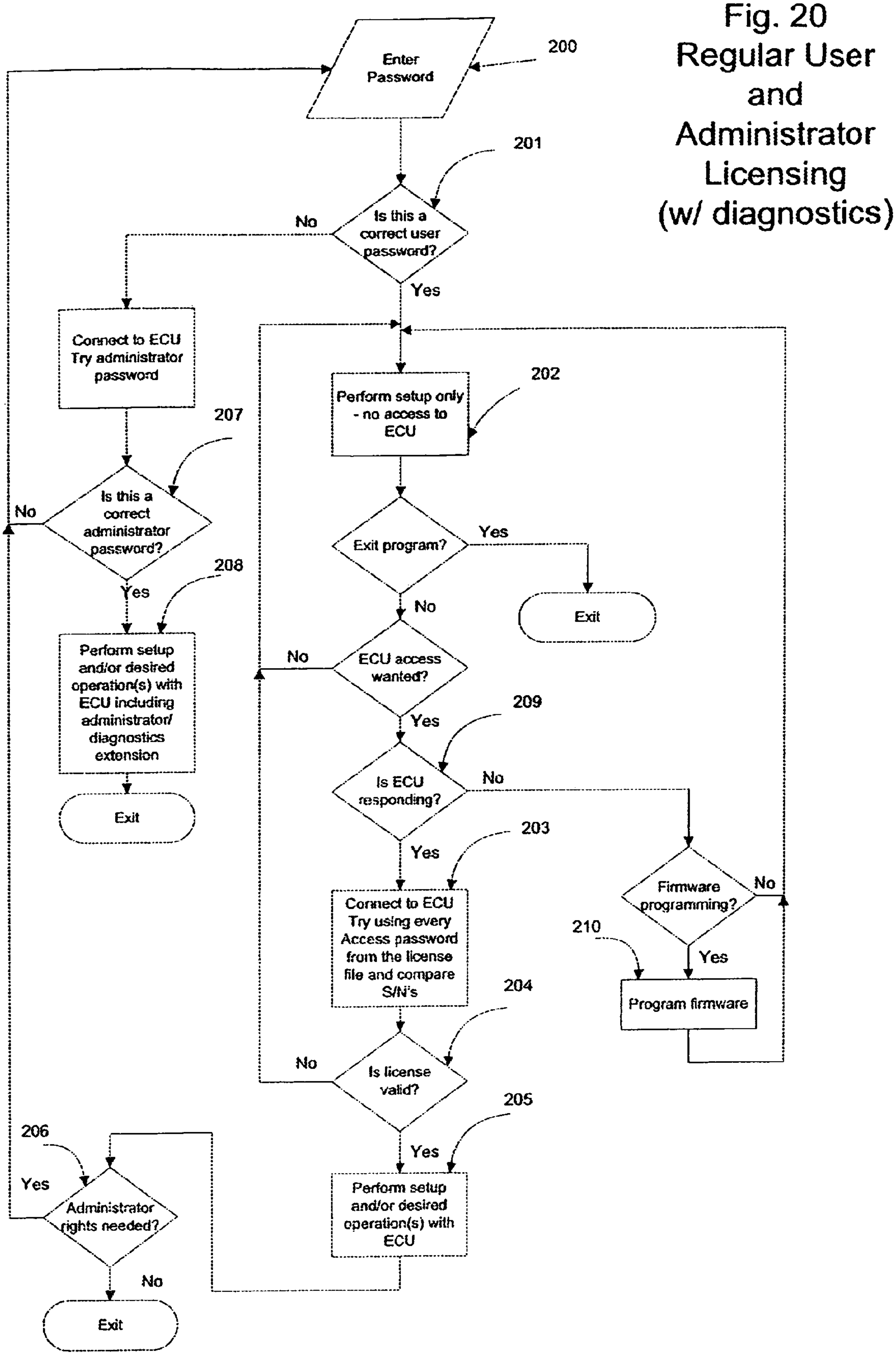
Fig. 20 Regular User and Administrator Licensing (w/ diagnostics)

PIL PASSWORDS with diagnostics enabled

| FUNCTION | USER PASSWORD w/o license | USER PASSWORD w/license | USER PASSWORD w/default license | ADM. PASSWORD confirmed | DEF. ADM. PASSWORD confirmed - EEPROM corrupted |
|---|---|---|---|---|---|
| Open PC program | X | X | X | X | X |
| Configure com port | X | X | X | X | X |
| Install license file | X | X | X | X | X |
| Change user password | X | X | X | X*** | X*** |
| Check ECU serial number |  | X |  | X |  |
| Check ECU firmware version |  | X | X | X | X |
| Check system status |  | X | X | X | X |
| Read system voltages |  | X | X | X | X |
| Read temperature |  | X | X | X | X |
| Check/modify configuration |  | X | X**** | X | X**** |
| Check/modify real time clock |  | X | X | X | X |
| Send software reset |  | X | X | X | X |
| Change ECU baud rate |  | X | X | X | X |
| Erase RF transmitter memory |  | X | X | X | X |
| Program RF transmitter |  | X | X | X | X |
| Lock and unlock |  | X | X | X | X |
| Retrieve log events |  | X |  | X |  |
| Export log events to .txt file |  | X |  | X |  |
| Change Access pwd (ECU & lic. file) |  |  |  | X |  |
| Change Administrator password |  |  |  | X |  |
| Save updated license to disk |  |  |  | X |  |
| Update ECU firmware | X* |  |  | X** | X** |
| Check/modify additional config. items |  |  |  | X | X**** |
| Run diagnostic cycling |  |  |  | X | X |
| Perform diagnostic lock and unlock |  |  |  | X | X |
| Calibrate temperature and voltages |  |  |  | X |  |
| Run diagnostic test |  |  |  | X |  |
| Repair EEPROM |  |  |  |  | X |

NOTE: default license is used when EEPROM memory is corrupted (default Access Password + S/N = 0)

X* - if ECU is not programmed/not responding
X** - if ECU is already programmed
X*** - if user password is known
X**** - read only

Fig. 21

ELECTRONIC CONTROL SYSTEM USED IN SECURITY SYSTEM FOR CARGO TRAILERS

CROSS-REFERENCE TO RELATED APPLICATION

This is a continuation of U.S. application Ser. No. 10/777,876, filed Feb. 12, 2004 now U.S. Pat. No. 7,091,857, entitled "Electronic Control System Used in Security System for Cargo Trailers."

FIELD OF THE INVENTION

This invention relates to an electronic control system that is used in interfacing to and controlling various devices used in security systems for containers having doors, and also has particular application to apparatus and methods for securing roll-down and/or swing-open doors for cargo trailers, such as cargo containers, trailers, delivery vans, storage facilities, and cargo trailers.

BACKGROUND

A need exists for a security system that employs an electronic controller used specifically to control various devices and interface with the controlled devices using software unique to the security process employed by those devices, so that it can be used for both roll-down doors and swing-out doors. A need also exists for a security system that stores a number of information records, such as records concerning the unlocking, locking, opening or closing of the door, including the date, time, air temperature, and/or geographical location of such event. The records need to be updated in such a way that the new ones replace the oldest as soon as the maximum number of records allowed is reached.

Furthermore, a need exists for an electronic control system that communicates with a unique protocol and provides a customer a secure two-way connection using a remote terminal, such as a personal computer (PC). A need exists for a PC software program to communicate with the electronic controller, update its software, adjust features, enable/disable and program input devices, calibrate, diagnose problems, and retrieve information records. The supplier should be able to control access by issuing software licenses for each electronic control system. The customer should be able to protect access to the security system by setting and maintaining software passwords.

A need further exists for an electronic control system that operates on its own, without external power connected, for a maximum possible time duration, and to maintain its power source by charging it when the outside power is available and controlling which power source is used by the system.

SUMMARY

The disclosed apparatus and methods avoid some of the disadvantages of prior devices that do not employ an electronic control system, and add new features. In an embodiment of the invention, a security system is provided for a cargo container having a door. The security system comprises an electronic control unit capable of performing at least one activity and monitoring at least one function and being operably communicable with a remote computer terminal. A first software control program is provided within the electronic control unit to monitor the activity and the function. A second software control program is provided within the remote computer terminal and is capable of retrieving the activity and the function from the first software control program.

In an embodiment of the invention, a method is provided for monitoring and recording a condition of a cargo container having a lockable door using a cargo security system. The method comprises an electronic control unit capable of monitoring at least one function and creating an alarm condition; a sensor capable of measuring a parameter and being operably coupled to the electronic control unit; and a remote terminal computer capable of operably communicating with electronic control unit. The method comprises the steps of disposing the electronic control unit within the cargo container; comparing the parameter with a table having parameter limits; and creating an alarm condition if the parameter does not comply with the parameter limits.

In an embodiment of the invention, a method is provided for securing from the inside the cargo of a trailer having a container and cargo door accessible from the outside for closing the container and being movable from an open position to a closed position. The method comprises providing a security device containing a latch with a screw on the inside of the container, and a linked electronic control system. The electronic control system may be used to operate and control turning of the screw in a direction, thereby moving the latch between unlocked and locked positions.

In one embodiment of the invention, the method comprises providing a control software program that controls the movement of the latch between the unlocked and the locked positions. The control software program may be located in a nonvolatile memory of the electronic controller or other memory retention device. A signal generation device may also be provided, which is capable of sending lock, unlock, or other control signals to the controller. The software determines when one of the control signals is sent from the signal generation device to the controller. For example, the unlock control signal may indicate that the security device should be in the unlocked position, but the lock control signal indicates that the security device is in the locked position. In order to maximize precision and repeatability of the security system to be able to stop at the same position at any voltage and temperature conditions, a short reverse control signal may also be applied after the main control signal is complete.

In one embodiment, the method also includes storing in memory control data indicative of the most recent control signals sent from the signal generation device to the controller.

In one embodiment, several different sensors could be coupled to the controller. The method includes the control software to process the sensor inputs. The security device position sensors indicate whether the security device is in the locked or unlocked position. One or more door sensors could be provided, which are also coupled to the controller. The method includes sensing, with the door sensor, whether the cargo door is in the open or closed position. A door position signal, indicative of whether the door is in the open or closed position, is sent to the controller. The method includes moving the latch from its unlocked position to its locked position, if the signal generation device sends the lock control signal to the controller, the security device position signal indicates that the latch is in the unlocked position, and the door position indicates that the door is in the closed position.

In one embodiment, a memory is coupled to the controller, with the controller activity being sent through the software which allows the memory to be capable of storing control data indicative of the most recent control signal sent from the signal generation device to the controller.

A more detailed explanation of the invention is provided in the following description and claims, and is illustrated in the accompanying drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 5 is a Data\Lock-Unlock screen without ECU-PC communication;

FIG. 6 is a Data/Lock-Unlock screen with ECU-PC communication;

FIG. 7 is a Configure system screen;

FIG. 8 is a Program RF key-fob screen;

FIG. 9 is a Firmware and password screen;

FIG. 10 is a Diagnostics screen:

FIG. 11 is a typical Setup screen;

FIG. 12 is a Diagnostic Test Mode screen;

FIG. 19 represents what a PC program user can access with different passwords, when diagnostic features are not enabled;

FIG. 20 is a flow chart representing how passwords and a software license are used to protect access to the security system, when diagnostic features are enabled;

FIG. 21 represents what a PC program user can access with different passwords, when diagnostic features are enabled.

DETAILED DESCRIPTION

In U.S. patent application Ser. No. 10/360,521, filed Feb. 6, 2003, a system is disclosed in which the inside of a cargo container is secured from the outside using a security device containing a latch with a screw on the inside of the container, and a linked electronic control system. The disclosure of U.S. application Ser. No. 10/360,521, filed Feb. 6, 2003, and which is assigned to the same assignee as the present invention, is hereby incorporated in full into the present application.

Figure 1:
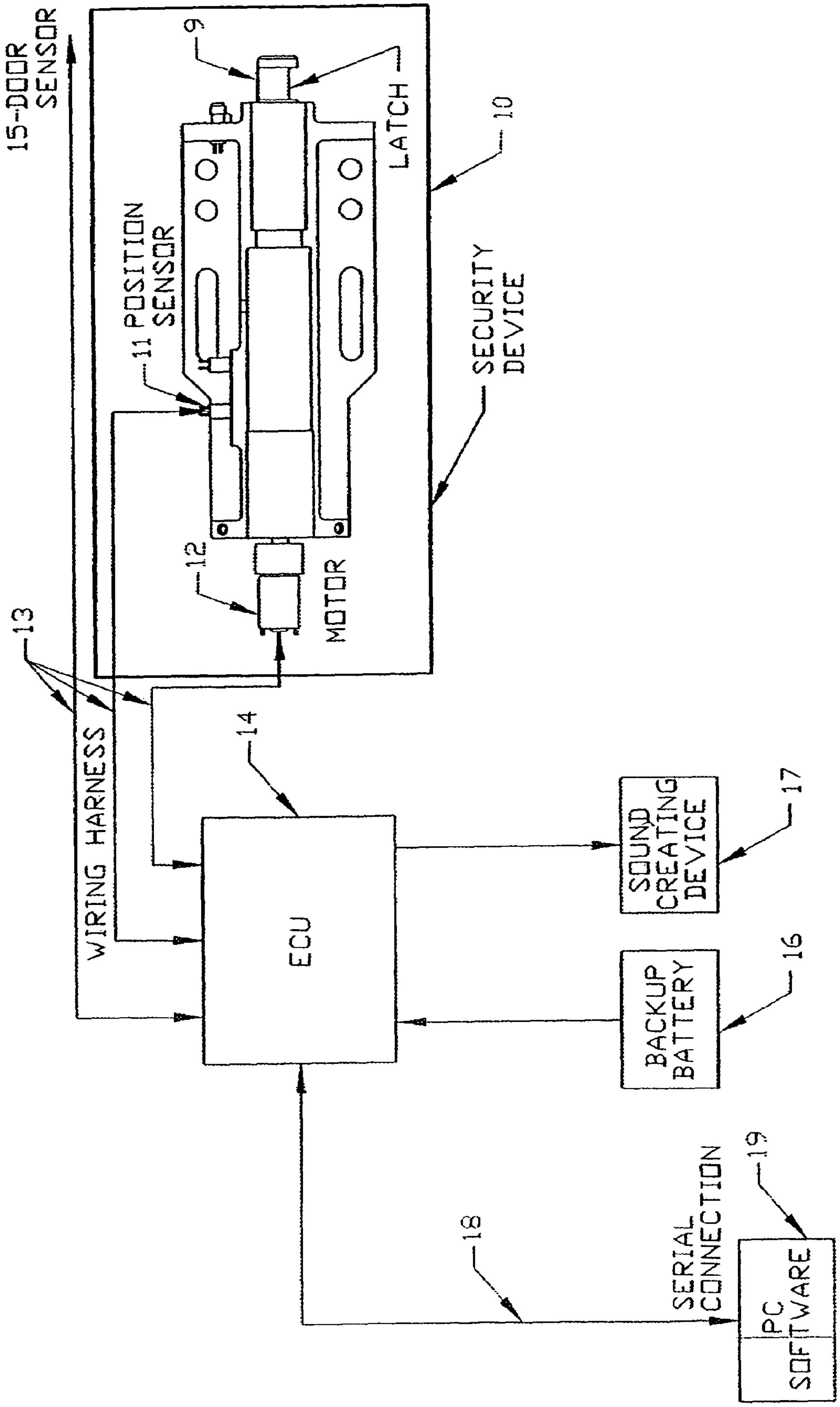
FIG. 1 is a security system drawing showing the security device and the electronic control system components.

Turning now to the drawings, and, more particularly, FIG. 1, there is a typical cargo security system comprising a security device 10 (including position sensors 11, a motor 12, and a latch 9), a controller, referred herein as an electronic control unit (ECU) 14, a wiring harness 13, a door sensor(s) 15, a backup battery 16, a sound creating device 17, such as a buzzer, and a serial connection 18 to a personal computer (PC) software program 19 for communication, firmware updating, adjusting features, enabling and programming input devices, diagnosing problems, and information records retrieval.

Figure 2:
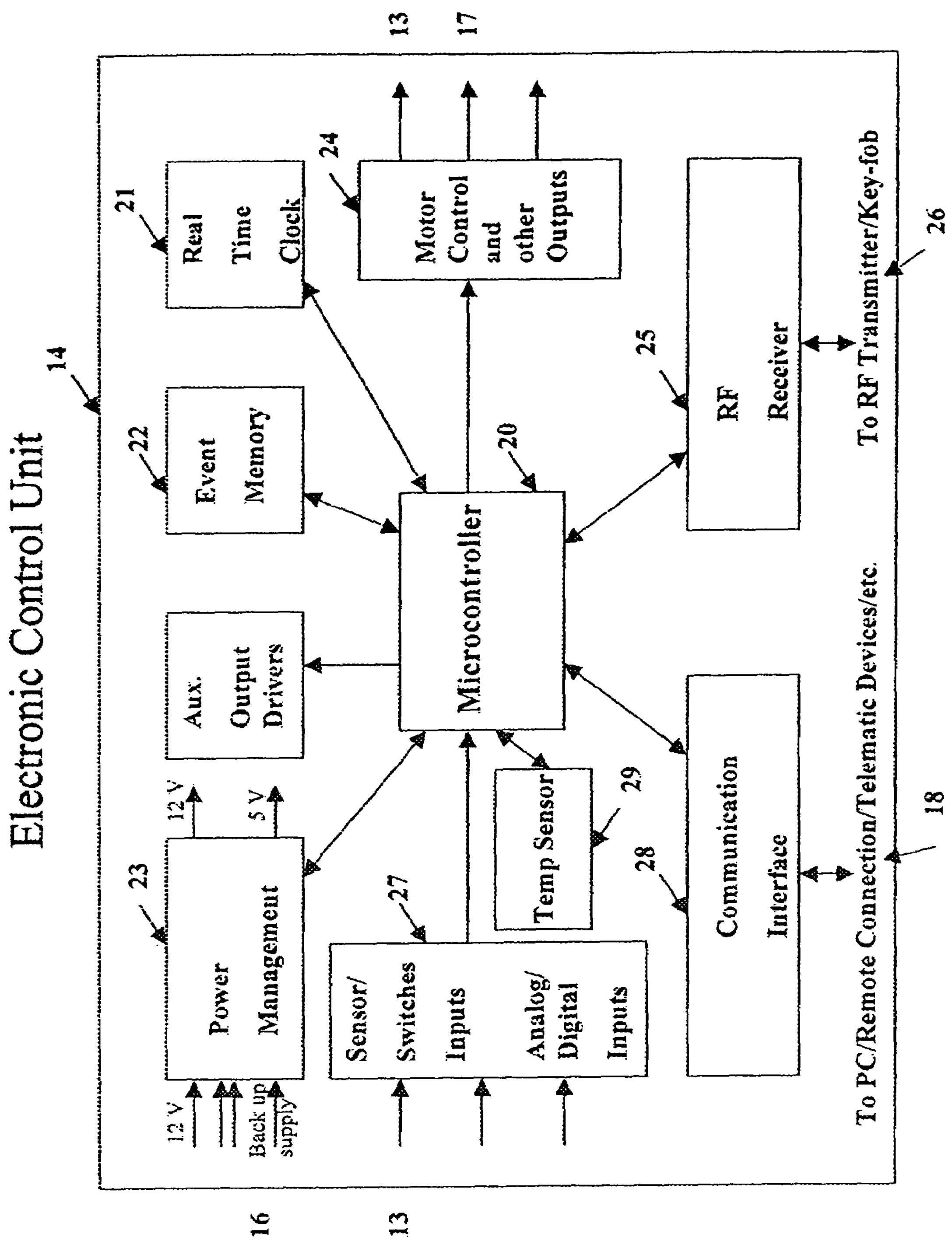
FIG. 2 represents the ECU and its internal components.

In one embodiment, the cargo security system includes a controller, such as the ECU 14 (FIG. 2) which controls a security device, such 10 as a stand alone lock, or as a device that can be coupled with telematic (GPS, cellular, GLS, wireless networks, etc) or RF systems to provide the security system that logs various events, including location of the event.

The ECU 14 can be comprised of a microcontroller 20 that may include internal memory (not shown) or that has memory coupled to it. A real time clock 21 (RTC) can be coupled to the ECU allow the timing of various events to be recorded in event EEPROM memory 22 coupled to the microcontroller 20. Such events may include, for example, opening or closing the door, the latch 9 moving to either an unlocked or a locked position, temperature readings, configuration and password changes, an RF key-fob ECU memory programming and erasing, firmware updates, an attempted break-in, problems or errors in the execution of commands or in the status sensed after a command. In one embodiment, the event memory 22 can record time, location, and the individual (or key-fob) associated with a particular event. The event memory 22 can be designed to control erasure of data and can be set up to override older information with newer. The RTC 21 may have an independent battery (not shown), in order to provide the time of events stored in the event memory 22.

In an embodiment, a power management system can be provided to adjust the operation according to the type of power used and to allow the power input to be switched between several different power supplies, for example, such as the truck alternator or battery, a stand alone (backup) battery 16 coupled to security system, solar panels, or other appropriate power supplies. In one embodiment, the power management device 23 can enable automatic recharging of the back up battery 16, whenever it is feasible, and can sense power, remaining this battery before the latch 9 is moved to the locked position in order to determine whether adequate power is likely to remain afterwards in order to return it to the unlocked position. If, for example, there is not enough power, the ECU 14 can be programmed to trigger a visual or audible warning 17 and either not take any action, or require the user to confirm that they want the latch 9 moved to the locked position even though there may not be enough power left to move it back to the unlocked position. Another option includes selecting the power source in such a way to maximize time available to operate on the backup battery 16. In some cases, the power management 23 may use the outside power source even when the backup battery 16 has a higher voltage, in order to preserve the backup battery 16 for use when the main power is removed. The security system can be configured to run on a variety of voltages, such as, for example, 6 VDC, or 12 VDC, or even 24 VDC.

A temperature sensor 29 may also be used to adjust duration of the locking and unlocking signals. The lower the temperature which naturally lowers the battery voltage, the longer the signal needs to be to make sure the latch 9 reaches the locked and unlocked positions. Also, the ECU 14 could be programmed to issue a warning, an alarm, or record a log event in case there is a sudden change in temperature, and it could also be programmed to behave differently depending on the temperature. For example, some of the power saving features may be enabled/disabled at certain temperatures, since the electronic devices may change their electrical consumption characteristic with temperature changes.

The ECU 14 is operably coupled to a motor 12 and thereby controls the operation of the motor 12. In one embodiment, an H-bridge driver may be utilized as the motor control output 24 in such a way, that a positive voltage is applied to one motor 12 terminal and the ground reference to the other, in order to turn it in one direction, and when voltages are reversed, the motor 12 rotates in the opposite direction. When the movement in one direction is complete, the ECU 14 may send a short reverse control signal for the motor 12 to operate in the opposite direction. This action will allow the latch 9 movement to stop immediately, and therefore it improves precision and repeatability of the system response under different voltage and temperature conditions.

A receiver, such as an RF receiver 25 may be operably coupled to the microcontroller 20. A transmitter, such as an RF two channel key-fob transmitter 26, can be provided with two RF outputs to transmit signals to the RF receiver 25. Signals transmitted from the RF transmitter 26 are the signals that are used to elicit a response from the ECU 14. For example, one RF output signal of the transmitter 26 can be used to cause the ECU 14 to activate the motor 12 and move the latch 9 to the locked position. The other transmitter 26 output can cause the ECU 14 to activate the motor 12 and move the latch 9 to the unlocked position.

Alternately, an RF three channel (or any other suitable number of channel) key-fob transmitter can be used. Multiple key-fob transmitters can be provided and each might be separately coded so that the identity of the particular key-fob 26, and thus the individual entrusted with that key-fob, can be recorded in the event memory 22 with any other appropriate information regarding the particular event. If the three-channel key-fob is used, the third channel can indicate an alarm condition, or it could become a master fob to enable or disable the ECU 14 from responding to a signal from other fobs. As another alternative, the third channel could be used to initiate and perform a new key-fob programming process, if the user does not want to use the PC software 19 for the RF transmitter programming. Otherwise, the key-fobs 26 are programmable in the field using a PC. The PC program 19 may also used to erase the key-fob memory in RF receiver 25 when a key-fob 26 is stolen or lost.

The ECU 14 may be provided with a plurality of other inputs 27 or outputs 24. For example, one or two digital inputs 27 could be used to hardwire a remote keypad as an alternative to the RF operated key-fobs 26. Some keypads may provide separate lock an unlock signals, and some may use only one input for both signals. The ECU 14 could be configured to accept both types of keypads. If only one input is provided, the ECU 14 will determine the current status of the security device 10 and move the latch 9 to the opposite position, when a valid keypad signal is received.

Another digital input 27 could be used with a sensor 15, for example a switch, that produces a signal when the door is open. In one form, such sensor can take the form of a magnetic switch that sends a signal when the door is opened and, thus, moves away from the magnetic switch. In another form, the magnetic switch is a magnetic reed switch. Additional digital or dry contact inputs 27 can be provided for additional external switches or sensors inputs. The ECU 14 may also use analog inputs 27 for voltage, temperature, or other measurements. For example, a light sensor may be used, providing a variable voltage or resistance input 27 to the ECU 14, to sense if the door was open, or maybe another event caused the light to be sensed.

The ECU 14 can also include a plurality of outputs 24 for control signals sent to other devices. Outputs 24 could be an open collector/open drain to sink a current, or a relay type to provide electrical isolation (dry contact type). Feedback input signals, coming to the ECU inputs 27, can indicate that the security device 10 is in the locked position or is unlocked, the door is closed or opened, or that an error condition exists. In one form, an error signal is generated if two different sensors indicate opposite states, such as one sensor indicating that the security device 10 is in the locked position and the other sensor indicating that it is unlocked.

In one form, an output signal 24 is sent to a device, such as a camera, to activate the device when the vehicle door is opened. When a camera is used, a recording can be made of any loading and unloading activities when the door is opened. One, or more, feedback input signals 27 can be used by the ECU 14 to activate a buzzer 17, a siren, or another warning device. In one form, a warning device is located in the cab and indicates that the security device 10 is unlocked, or that the door is opened. In selected situations, an output signal 24 can be used to lock the front of a cab hauling the cargo trailer or to disable the engine.

A plurality of serial ports, such as a nine-pin connector communication port 28, that is often referred to as RS-232, can be provided to interface with one or more auxiliary devices, such as a programming terminal or computer, a keypad, a telematic device, a GPS tracking device, a serial sensing device, or a modem. Such auxiliary devices can be used to send signals to the ECU 14 to lock or unlock the security device 10. They can also be used to program the ECU 14 firmware, or to download information stored in the event memory 22 or other memory associated with the ECU 14. In one form, a keypad is provided that requires the entry of an employee identifying code to unlock the door, so that a record of the unlocking of the door can be saved in memory 22. The telematic device and GPS tracking device can be used to track the location of the cargo transport vehicle when the cargo door is opened or unlocked and send the data to a remote location. In one form, the ECU 14 is normally in the sleep mode and "awakens" when a command is sent, or a signal is sent from one of the sensors or other devices.

Figure 3:
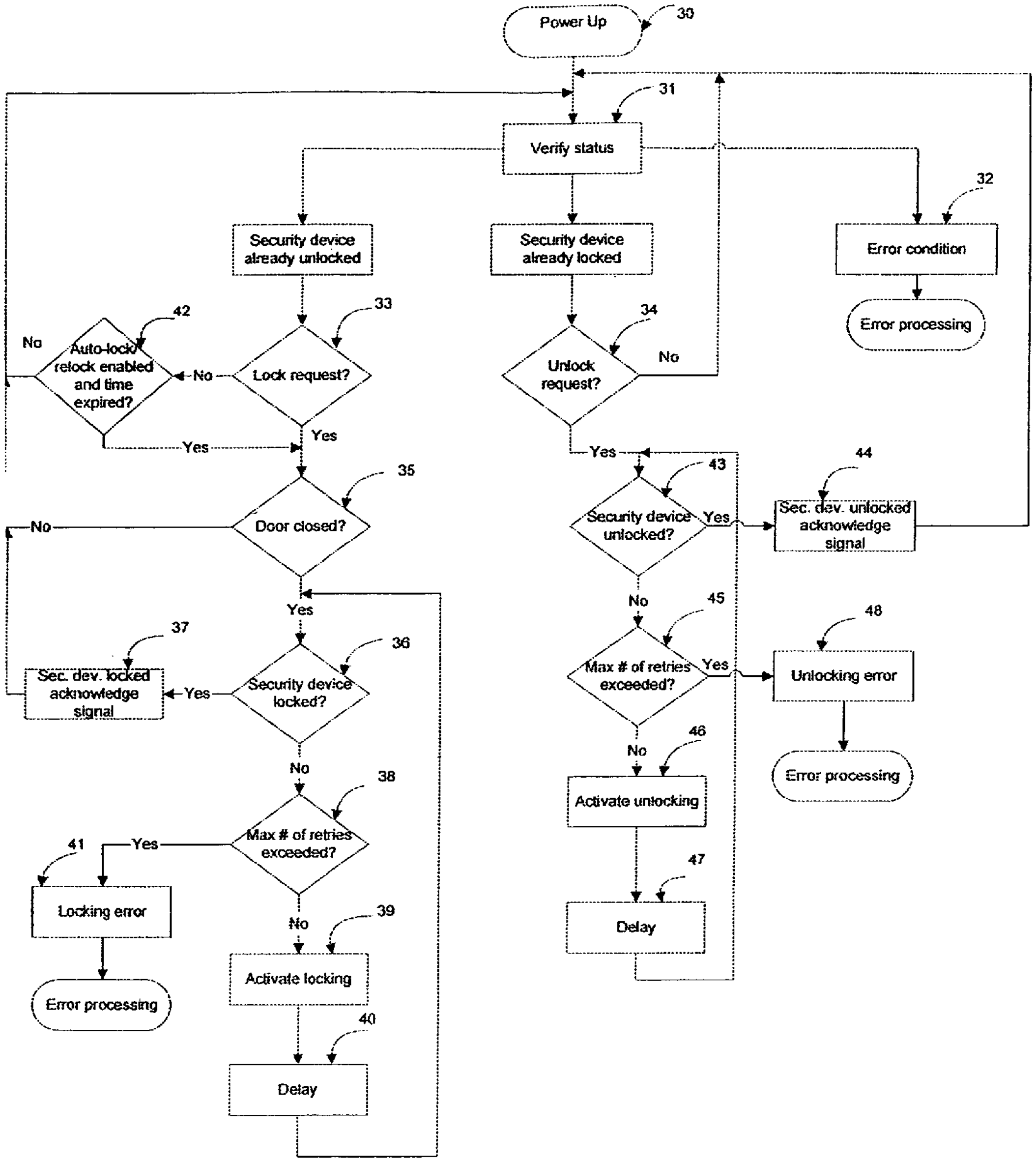
FIG. 3 represents a flow chart showing the ECU main functionality.

FIG. 3 shows a functional description of a program that can be run by the ECU 14. After being turned on, the power-up process 30 will include, for example, verification 31 and status check of all states and sensor inputs. If an error condition 32 is detected during power-up (e. g. security system in unknown state), the program may try to correct it by applying an automatic lock/unlock request and/or may signal this condition to the user by flashing an LED or by activating an alarm 17. In normal situations, the ECU 14 will wait until either a "Lock request" 33, or an "Unlock request" 34 are supplied. In one form, both "Lock request" 33 and "Unlock request" 34 may come from an RF key-fob 26. If the "Lock request" 33 is generated, the program may determine whether the door is closed at 35. If the door is not closed, the program goes back to verify status 31. However, if the door is closed, the program verifies if the security device 10 is already in the locked position 36. If the security device is in the locked position, the program sends a "Locked acknowledge signal" 37 and goes back to verify status 31. If the security device 10 is not in the locked position, the program may verify if the maximum number of locking retries 38 is exceeded. This number could be programmed in the ECU 14 by the user to protect the security device 10 in case an obstruction (e.g. ice, debris) prevents the locking process. If the maximum number of retries 38 is not exceeded, the "Activate locking" 39 command is generated.

At this time, the motor 12 is energized which causes the latch 9 to move to the locked position. There is a delay 40 needed for the motor 12 to operate, after which the program checks if the locking process was successful at 36. If the security device 10 is in the locked position, the program sends a "Locked acknowledge signal" 37 and goes back to verify status 31. If the security device 10 is not in the locked position, the locking process is repeated, unless the number of locking retries is exceeded. In that case, an error 41 is generated and the locking process stops. The maximum number of locking retries could be any number from 0, 1 to as much as 100 in some cases. The security device 10 "Locked acknowledge signal" 37 could be used to generate an output to the user, such as a chirp of the buzzer 17, an LED or an indicator light output, or an LCD screen output. In a different implementation, instead using a delay 40, the ECU 14 may monitor the security device 10 position sensor(s) status and disengage the motor 12, when the sensor(s) indicate that the locked position has been reached.

In one form, the system can be programmed to have an automatic lock/relock feature enabled and generate automatic lock requests 42. The automatic locking may occur when the user closes the door, but does not send a "Lock request" 33 signal within a specified period of time. The automatic relocking may occur when the user requests the security device 10 to unlock, but does not open the door within a specified period of time. The time period can be programmed by the user from 0 to as much as 5 min, or even 10 min.

In some cases, not shown on FIG. 3, the ECU 14 could be programmed to accept a "Lock request" 33 signal even when the door is not closed. In one instance, the request could be memorized and executed by the ECU 14 after the door closure is detected. The "Lock request" 33 also could be executed when the door is open, since the construction of the security device 10 allows the door to close even when it is in the locked position. During the closing, the security device locking mechanism (latch) 9 will move inside compressing a spring (not shown) until it has cleared the receiving device. When the door is fully closed, the compressed spring will cause the latch 9 to move back to the locked position.

If the "Unlock request" 34 is generated, the program determines whether the security device 10 is already in an unlocked state 43. If it is unlocked, the program sends a security device "Unlocked acknowledge signal" 44 and goes back to verify status 31. If the security device 10 is not unlocked, the program verifies if the maximum number of unlocking retries 45 is not exceeded. This number could be programmed in the ECU 14 by the user to protect the security device 10 in case an obstruction (e.g. ice, debris) prevents the unlatching process. If the maximum number of retries 45 is exceeded, the "Activate unlocking" 46 command is generated. At this time, the motor 12 is energized which causes the latch 9 to move to the unlocked position. There is a delay 47 needed for the motor 12 to operate, after which the program checks if the unlocking process was successful. If the security device 10 is unlocked at 43, the program sends an "Unlocked acknowledge signal" 44 and goes back to verify status 31. If the security device 10 is not unlocked, the unlocking process is repeated, unless the number of unlocking retries is exceeded. In that case, an error 48 is generated and the unlocking process stops. The maximum number of unlocking retries could be any number from 0, 1 to as much as 100 in some cases. The security device 10 "Unlocked acknowledge signal" 44 could be used to generate an output to the user, such as a chirp of the buzzer 17, an LED or an indicator light output, or an LCD screen output. In a different implementation, instead using a delay 48, the ECU 14 may monitor the security device 10 position sensor(s) status and disengage the motor 12, when the sensor(s) indicate that the unlocked position has been reached.

Figure 4:
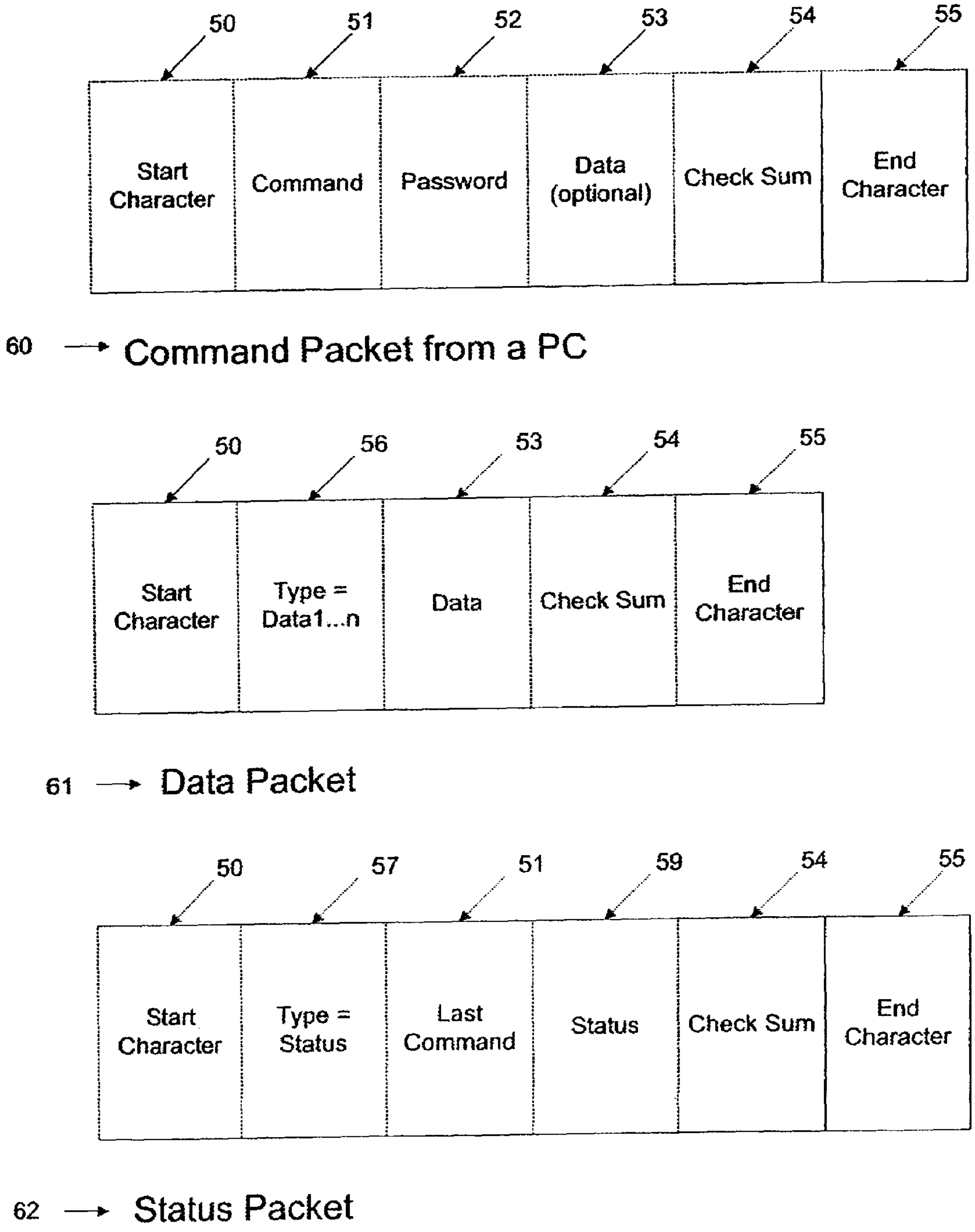
FIG. 4 shows the PC-ECU communication protocol packet format.
Figure 5:
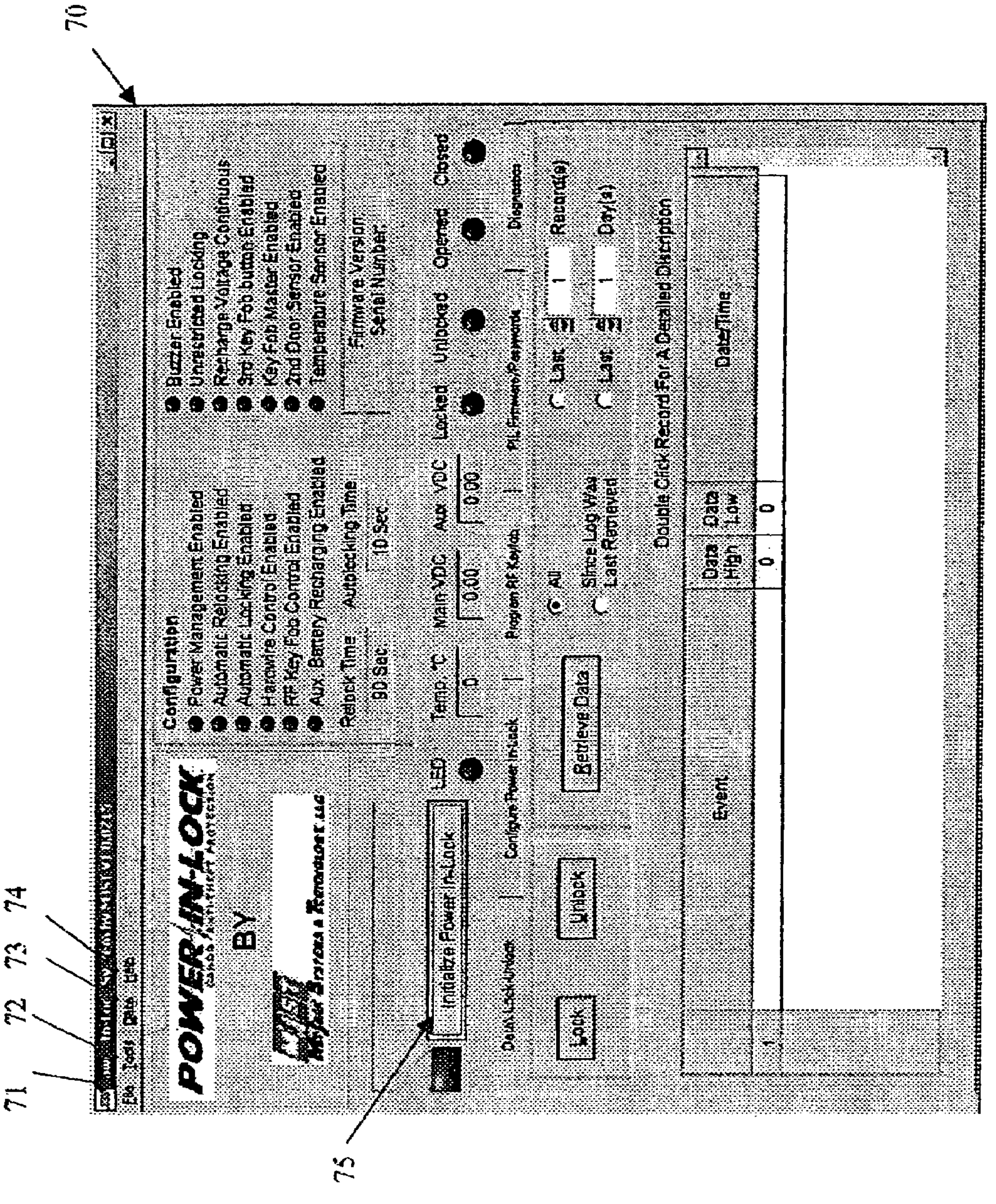
FIGS. 5-12 represent a possible implementation of the PC program, where.
Figure 6:
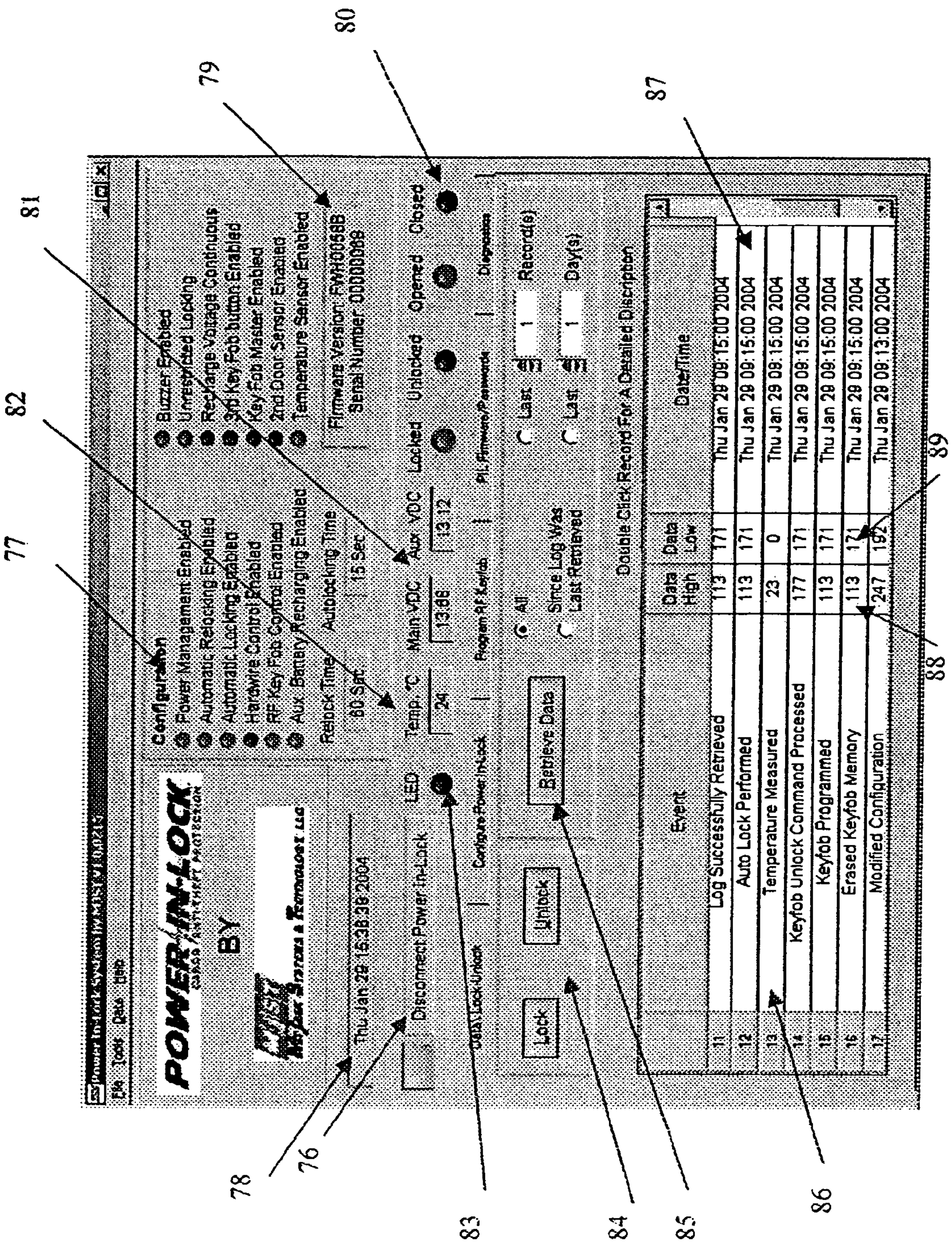
Figure 7:
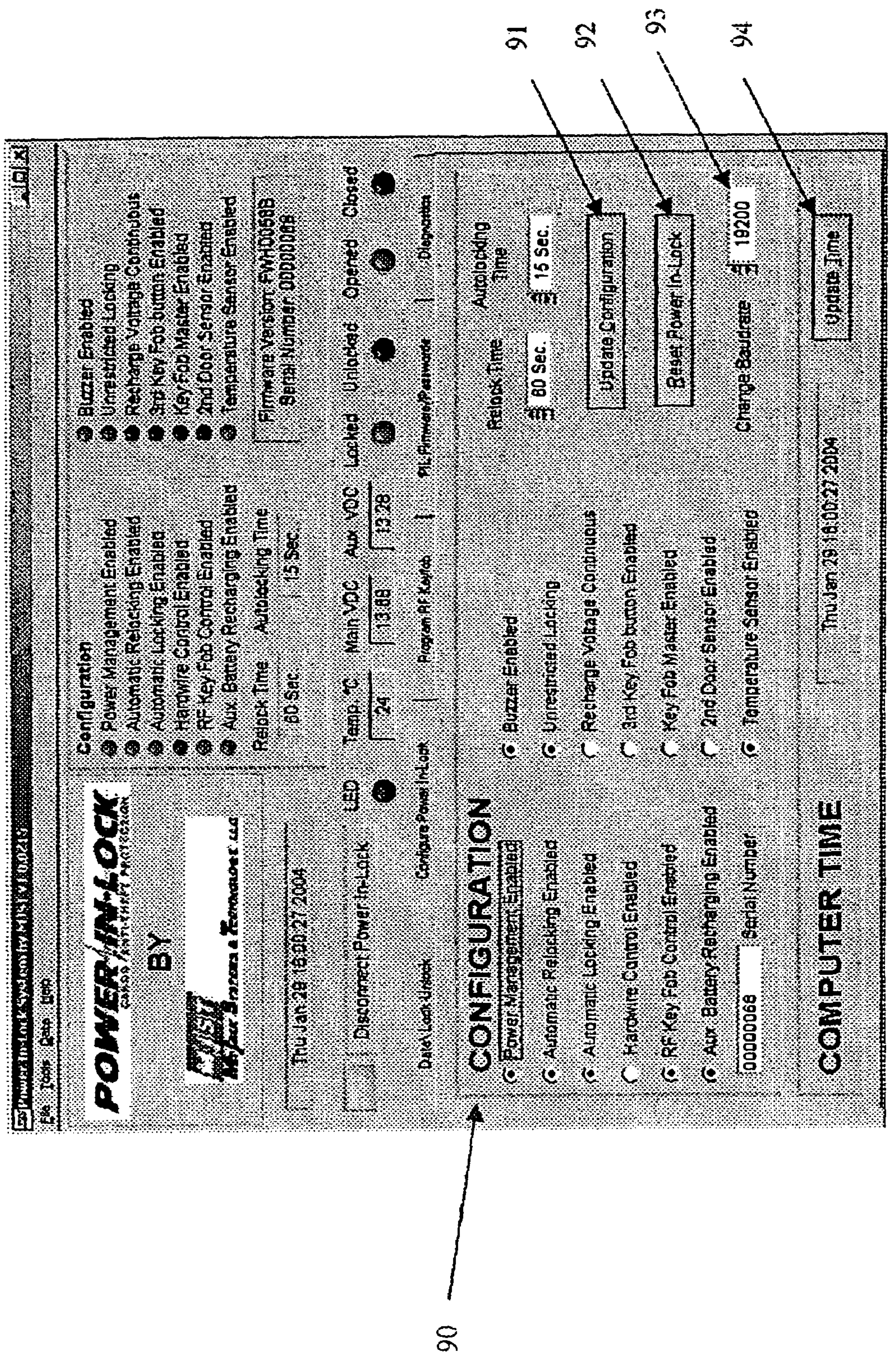
Figure 8:
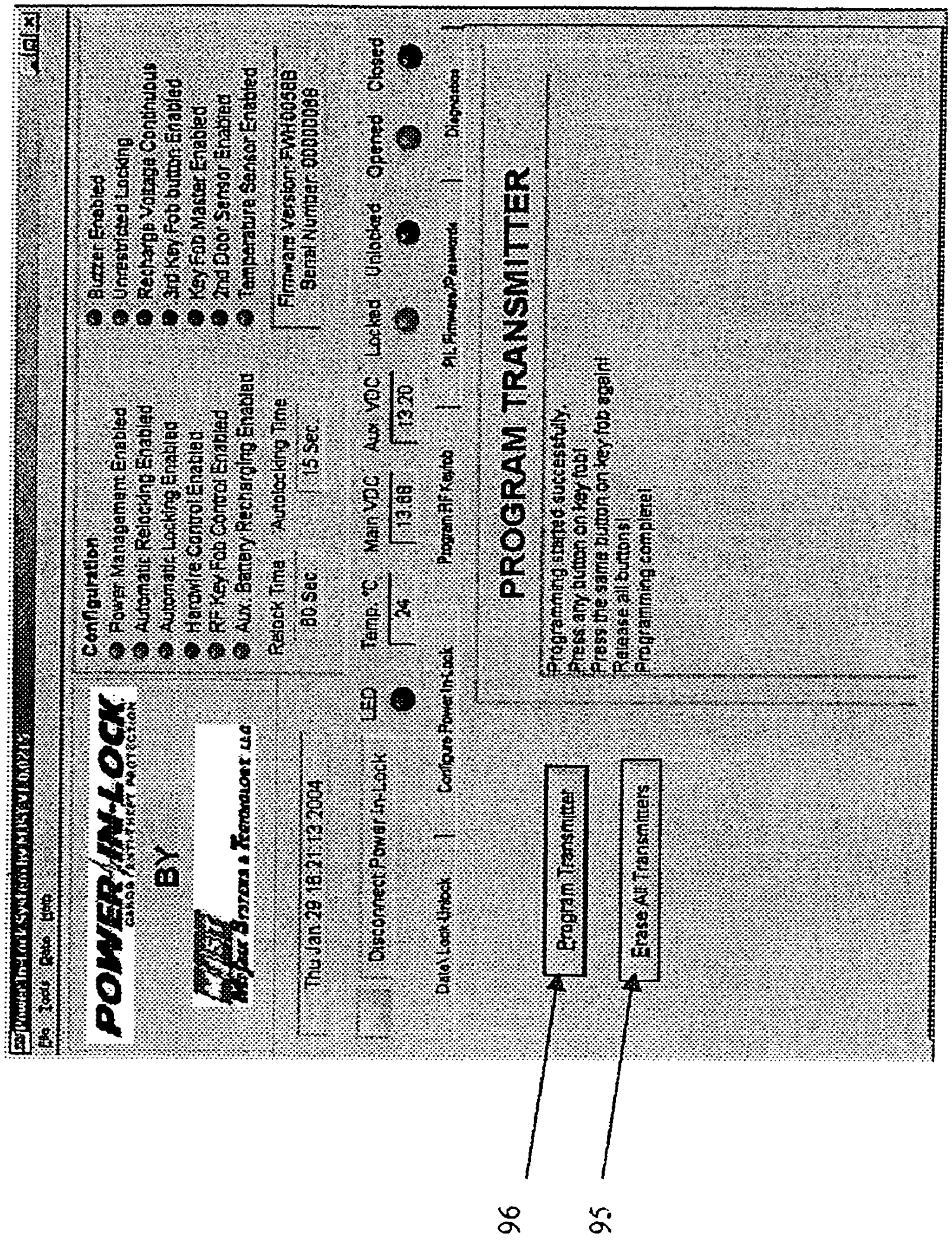
Figure 9:
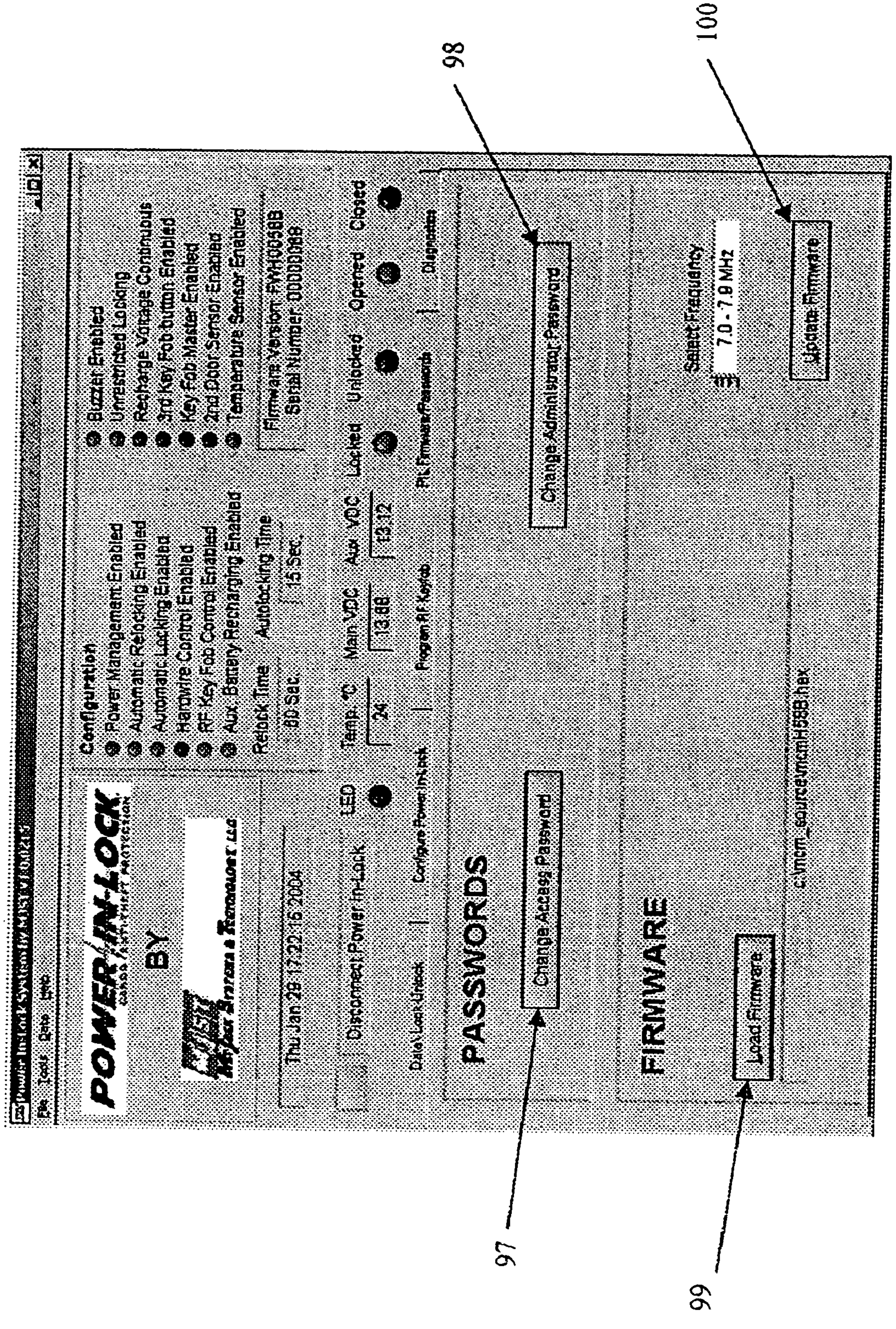
Figure 10:
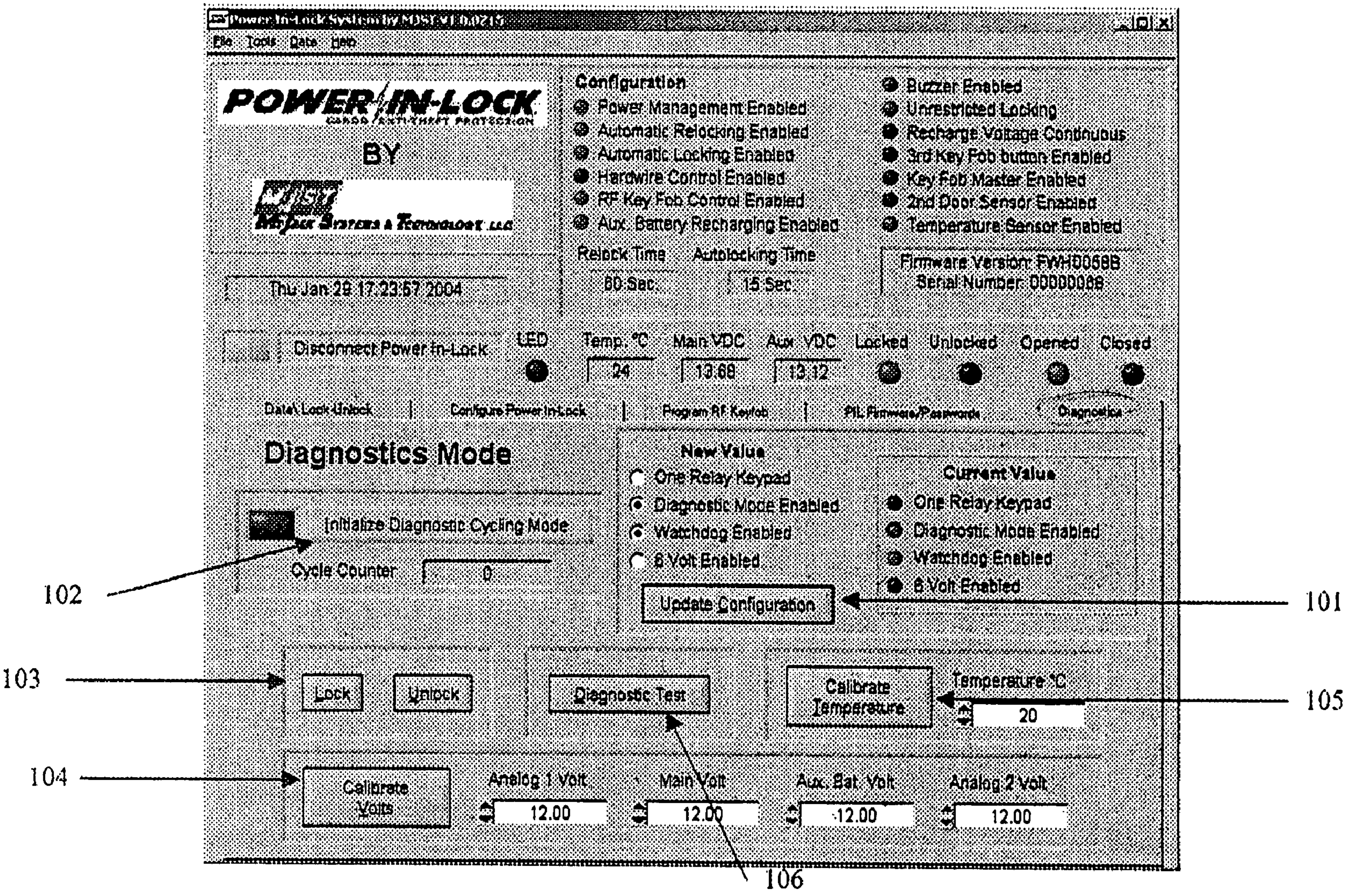
Figure 11:
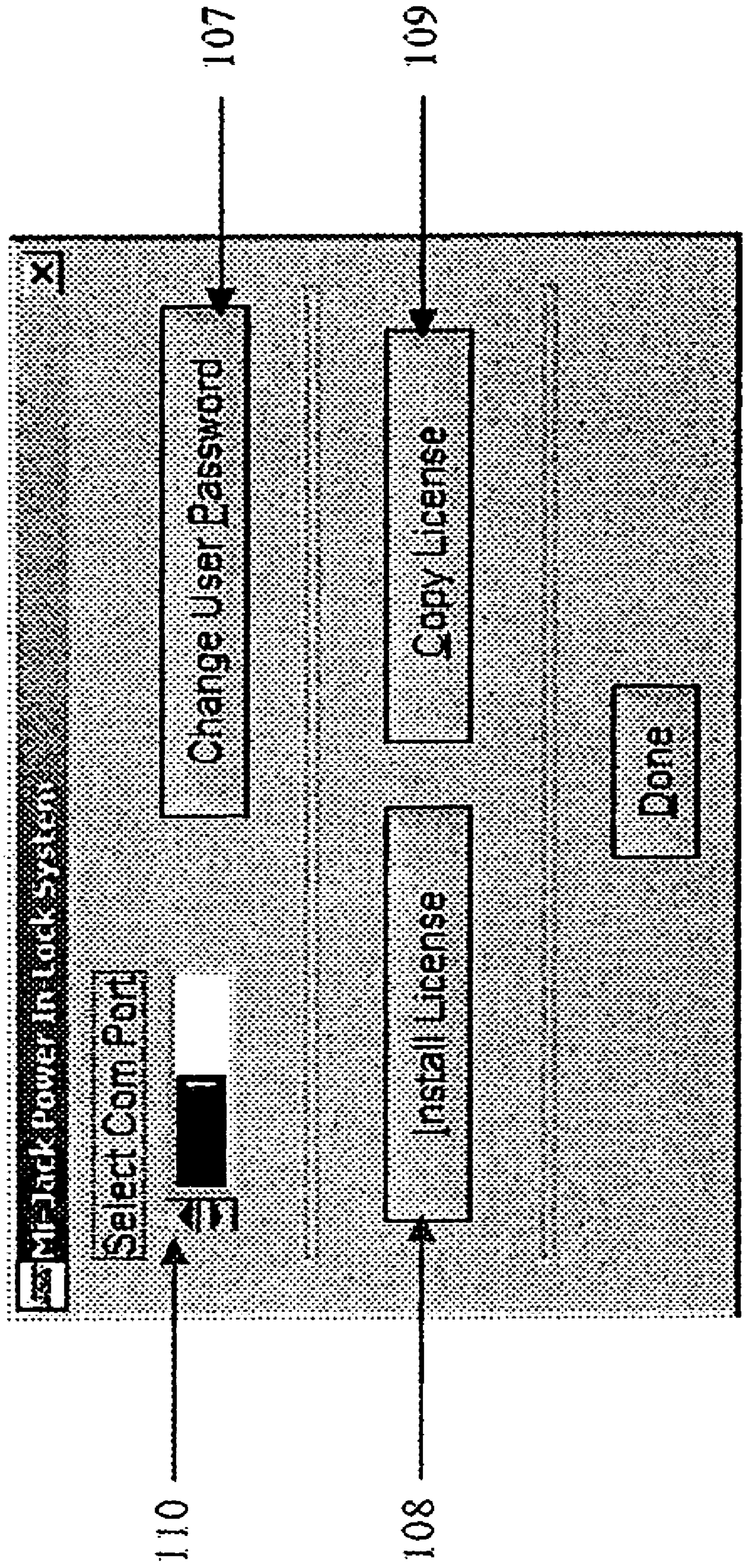
Figure 12:
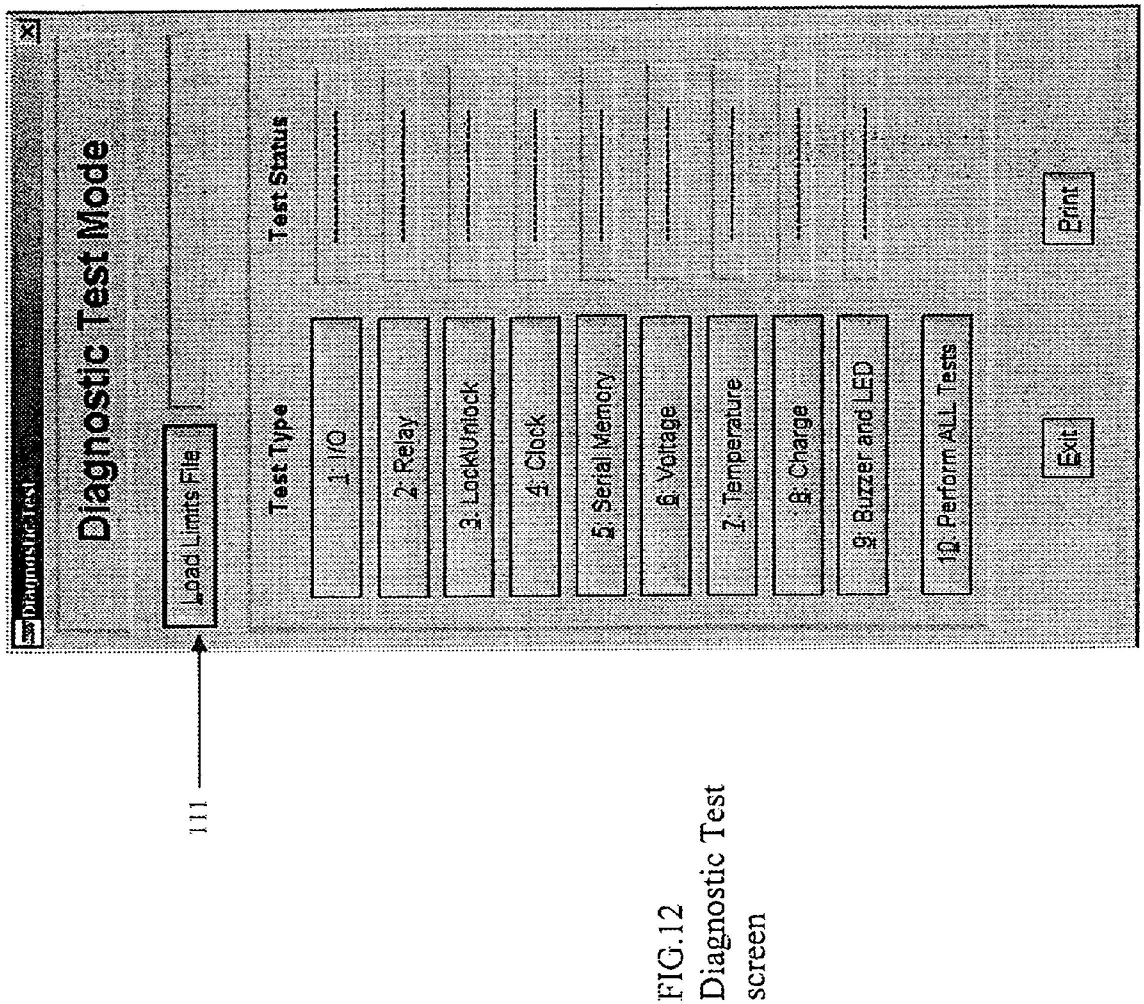

Several different communication protocols could be used for commands, status, and data exchange between the security system and a PC software 19. One of them is described in details below. This unique serial protocol has been developed to communicate with the ECU 14 through PC software 19, or a remote connection. FIG. 4 indicates main parts of this protocol. The PC software 19 issues command packets to communicate to the ECU 14 what action it should take. Each command packet 60 may contain a unique start character 50, a command character(s) 51, a password 52 (either Administrator or Access), data 53 (optional—if a command argument is needed), a check sum 54, and a unique packet end character 55. The ECU 14 may echo the command packet 60 back to the PC, if this option is selected. A modified configuration is an example of a command argument.

In order to send one byte (8 bits) of data, 2 ASCII characters are used in this protocol. For example, to send a hexadecimal 8F (a binary 10001111), the communication protocol uses an ASCII "8" (hexadecimal 38) and an ASCII "F" (hexadecimal 46). Therefore, for each data byte to be transmitted, 2 ASCII characters are used. This approach may seem inefficient, but it is simple and easy to generate and decode by both ECU 14, and PC program 19.

When the command 60 is executed, the ECU 14 may return a data packet 61 and a status packet 62. The data packet 61 is applicable to some commands (e.g. retrieve event log), and some of them don't have any data packet 61 associated with them. If the data packet 61 exists, it should include the start character 50, a data packet type character 56, data transmission 53, the check sum 54, and the end character 55. There may be several different data packet type characters 56, depending on how many bytes the data packet 61 contains and what is the data structure.

The ECU 14 should always respond to each command 60 with the status packet 62 transmission. The status packet 62 comprises the start character 50, a status packet indicator character 57, the last command 51, a status of the command execution 59, the check sum 54, and the end character 55. In some cases, when the command 60 requires longer action from the ECU 14, or to perform several intermediate steps, there may be several status packets 62 sent to indicate the status change, and then at the end the final status packet 62 is issued. The checksum 54 for each packet is calculated to prevent accepting corrupted communication packets. In some instances the checksum could be replaced with more sophisticated methods, like CRC-16, CRC-32, or others.

In one embodiment, the PC program 19 communicating with the ECU 14 may look like the one presented in FIG. 5 to FIG. 12. The program 19 needs to be able to verify software license compliance and provide a secure access to the ECU 14 to perform various tasks, including checking of the security system status, modifying the system configuration, programming RF transmitters 26, changing passwords, updating the ECU 14 firmware, adjusting the RTC 21, retrieving event memory 22, locking and unlocking the security device 10, calibrating voltages and temperature, and diagnosing problems.

In order to start the PC program 19, the user needs to provide a valid password—either a User, or an Administrator password. If the User password is verified, a Data\Lock-Unlock screen (FIG. 5) is displayed on the PC. A second way to reach this exact screen is to provide a valid Administrator password, without installing or detecting a valid software license for the security system. At this point, the user can select one of four items from a menu bar 70. In one embodiment the "File" option 71 may let the user to load, save, or print the PC program 19 configuration or security systems' data, and also exit the program. The second option "Tools" 72 may provide the user a possibility to setup the PC program 19, adjust screen size and colors, or access other available software tools. The third option "Data" 73 may allow the user to export the event log to other PC programs in form of a text file or a spreadsheet, create graphs, or import saved data files for further processing. The last option "Help" 74 may provide written information on how to use this PC program 19 and how to configure the security system. Some of the options, described above, may not be available if the PC-ECU communication is in progress (example—setup screen FIG. 11), others may be only accessible when the communication is established (example—exporting the event log). For illustration purposes, a sample PC program 19 setup screen (FIG. 11) is provided. Using this window, the user can set a serial communication (Com) port 110, change the user password 107, install a software license file 108, or copy the current license file to a diskette 109 for installation on another PC.

When the Administrator password is used and a valid license for the security system is detected, the PC program 19 may start the PC-ECU communication automatically. Otherwise, the user has to press the "Initialize" button 75. When this happens, the PC program 19 will try to establish communication with the ECU 14 and to verify the software license. It checks if the security system serial number and the Access password, stored in the ECU 14, match the pair stored in the encrypted software license file installed to work with the PC program 19. If the license is verified, the user gains access to the ECU 14, based on what type of password was used. Software licensing is described later (FIG. 17-21). At that time, the "Initialize" button 75 changes to a "Disconnect" button 76, as is shown on FIG. 6.

All screens of the PC program 19, shown on FIG. 5-10, have a common area indicating the current configuration 77, the current RTC time 78, the current supply voltages 81, and the current temperature 82, and the current security system status 80 (security device locked/unlocked and door open/closed). The ECU 14 serial number and firmware version are also displayed at 79. Additionally, the program can indicate that maintenance is needed, such as by using an LED 83 either continuously turned on, or by flashing maintenance codes. The LED 83 may be also used in diagnostic mode to calibrate the security device position sensors 11. The screen LED 83 is duplicated in one of the open drain ECU outputs 24, and a real LED could be used there.

The first communication screen (FIG. 6) lets the user operate the security device 10 by selecting one of the buttons at 84, and to retrieve the event memory 22 by pressing "Retrieve Data" 85. The event memory 22 may contain large number of events, as large as 2000, 4000, or even 8000. When the memory is filled with events, the oldest of them are overwritten one by one by the new ones, so there is always a fixed number stored to retrieve. The PC program 19 gives user a choice to retrieve all events, or a selected number of the latest events, or the events since the last event retrieval, or the events for the selected number of days. The events are place in a table, starting with the most recent one. There are four columns displayed: event name 86, date/time of the event 87, data high 88, and data low 89. Both data high and data low display decimal equivalents of data bytes stored in memory. The PC program 19 converts these 2 bytes to more readable information, when it exports data to a text file. The user may be given a chart explaining what the associated data bytes represent for each event.

The second screen (FIG. 7) allows the user to change the system configuration by selecting options at the configuration area 90 and pressing the "Update configuration" button 91. The user can also synchronize the RTC 21 to the PC time by selecting the "Update time" button 94, change the communication baud rate at 93, and reset the ECU 14 at 92. The RTC time used by the ECU 14 is a GMT time and it is not adjusted for daylight savings. The PC program 19 knows a time zone of the PC it is running on, therefore, it automatically adjusts the RTC 21 information received form the ECU 14 to that time zone. For example, if the user uses EST time on his PC, this is the time zone that would be used in event records coming from the ECU 14, including changes for daylight saving. If the user switches the PC time to CST, all the records coming from the ECU 14 would have their time adjusted accordingly by one hour. The serial number at 79 is established during production process and cannot be changed afterwards. Standard baud rates at 93 from 19,200 bits/sec to as low as 1200 bits/sec are available.

The third screen (FIG. 8) allows the user to program 96 and erase 95 the RF key-fob memory in the ECU 14. The number of transmitters 26 available could be limited or not, depending on the firmware setup.

The fourth screen (FIG. 9) is only accessible to administrators and allows loading 99 and updating 100 the ECU firmware and Administrator 98 and Access 99 password changes. Any password changes are written to the ECU memory 22. In addition, if the Access password is changed, the software license file, which includes the Access passwords, is updated. After changing the Access password, the administrator must update license files on all the PC's used to service the particular security system. Otherwise, any user who's PC is not updated, will not be able to access this security system. This feature could also be used by the administrator to eliminate users who are no longer with the company, or who no longer need to have rights to communicate with a particular security system.

The fifth screen (FIG. 10) is only accessible by the security system supplier. This screen provides the ability to calibrate voltages readings at 104 and temperature sensor 29 at 105, diagnose problems with sensors and other devices at 106, perform cycling operation 102 of the security device 10, and set configuration items not accessible to the regular user at 101. To make sure that all functions are done on purpose (not by incident) the operator is required to enable the diagnostic mode in configuration 101 prior to performing any other function from this screen. Diagnostic "Lock" and "Unlock" commands 103 are also provided to help diagnosing position sensors 11 malfunctioning. The diagnostic mode is automatically disabled when this screen is exited.

Diagnostic test mode screen (FIG. 12) provides the operator a way of testing the security system functionality. Sensor readings are checked if they are within limits provided by a limit file loaded at 111—a text file prepared for each ECU 14 version. The test results are displayed, stored in a file, and could be printed after each test.

Giving the user a possibility to change configuration 77, based on his needs, provides great flexibility of the security system and allows it to be used in many different applications. For example, a delivery truck may require autolocking option to be enabled, and a container shipped overseas may not want this feature. Low power consumption may be very important for systems using their own batteries, but a quick key-fob 26 response may be more important for the delivery truck, even though the power consumption is higher. Some, or all, of the options might be pre-configured by the supplier based on the user's needs.

In the security system described hereon, the user may have the following configuration 77 choices to select:

Enable a software power management—option to minimize power consumption even at the expense of slower response time;

Enable autolocking—the security device 10 could lock by itself if the autolocking time expires and conditions described below are met;

Enable autorelocking—the security device 10 will be locked if it is unlocked, the relock time expires, and the door is never opened;

Enable hardwire control—digital lock and unlock inputs are enabled to accept external locking and unlocking command inputs 27 from switches or a keypad;

Enable RF key-fob control—an RF receiver 25 is enabled to accept RF commands from a key-fob 26 to lock and unlock the security device 10;

Enable backup battery recharging—the backup battery 16 can be charged from the main power source, if the conditions are right (right voltage difference, backup battery connected). If the voltage difference between the main and backup 16 batteries exceed certain limits, the charging may be turned on and off periodically to limit the average charging current/reduce heat dissipation;

Enable a buzzer—a buzzer 17 or other indicator output is enabled to confirm locking and unlocking processes. If the door is open, a short chirp may be used, if it is closed, longer signals are applied to positively confirm the operation;

Unrestricted locking—if this option is selected, the security device 10 will be locked (including autolocking) or unlocked regardless of the door status, otherwise the door closure is required for the security device to operate;

Recharge continuous—if selected, and the backup battery 16 recharging is enabled, the charging process will be permitted regardless of the backup battery 16 voltage, otherwise there are limits set in the ECU 14 firmware on when the charging should start and stop, in order to maintain the backup battery 16 at the right state of charge;

$3^{rd}$ key-fob button enabled—if selected and a 3-button key-fob is programmed for this security system, the $3^{rd}$ button will be able to perform its function (described below);

Enable key-fob as a master—if selected, and the $3^{rd}$ button is enabled, this button will enable/disable all locking and unlocking by RF keyfobs 26. This feature is designed for supervisors to be able to restrict access to cargo for the drivers at night, for example. Alternatively, the supervisor may use this button to program additional key-fobs 26. If this feature is disabled, and the $3^{rd}$ button is still enabled, it will be used as a panic button (buzzer 17 on for 30 sec at the time);

Enable $2^{nd}$ door sensor—if selected, another door sensor is added. This sensor may indicate that the door may be slightly open, and the ECU 14 may sound a warning signal 17 to a person forcing the door to open;

Enable temperature sensor—if selected, the temperature is measured by the temperature sensor 29, otherwise the temperature is set to 0 deg C.;

Additionally, during a system setup process, the supplier selects more configuration 101 items:

Enable one relay keypad—if selected, the ECU 14 will accept locking and unlocking commands on the same digital input;

Enable diagnostic mode—if selected, diagnostic features are enabled;

Enable watchdog timer—if selected, the ECU 14 is automatically reset, if the firmware is not executing properly;

Enable 6 V battery—if selected, the ECU 14 accepts a 6 V backup battery 16 and adjusts all verification limits for that battery.

The ECU 14 firmware is installed in the microcontroller 20 flash memory; however, it could be also installed in any EEPROM, EPROM, OTP (one time programmable), or RAM memory. The program could be written in "C", or any other high level programming language or assembly language, in any way where the compilation, assembly, or any other process creates a string of hexadecimal or binary characters to be executed by a microcontroller 20 inside the ECU 14.

Figure 13:
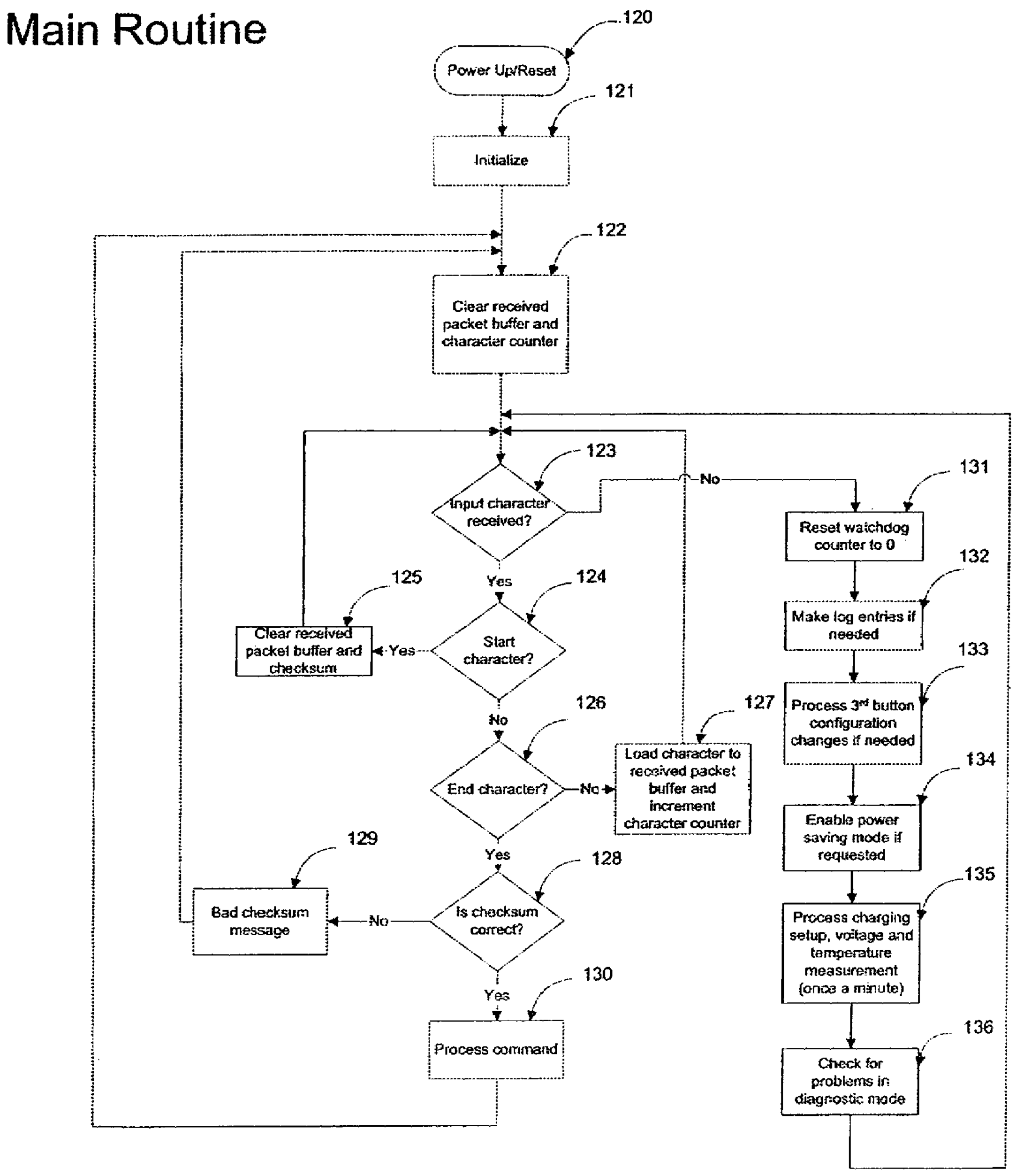
FIG. 13 is a flow chart representing the main loop in the ECU firmware.

In one embodiment, the main routine, executed by the processor may look like the one shown in FIG. 13. After powering up at 120, the ECU 14 initializes its configuration at 121, and clears a received packet buffer and a character counter at 122. At this time, it starts looking for characters—commands 60 from a PC or any other source at 123. If a character is received, it is verified if it is a valid start character 50 at 124. If it is the start character 50, the received packet buffer and the character counter are cleared at 125 and the program starts looking for the following command 60 characters. If the character received is not the start character at 124 and not the end character at 126, the program will load it to the received packet buffer and increment the character counter at 127. If the buffer is full, the next character will overwrite the oldest one received. Typically, the buffer size is 32 characters, but it could be different. Anytime the new start character 50 is detected at 124, the received packet buffer and the character counter are cleared at 125, and the program starts looking for valid command 60 characters again. If the valid end character 55 is received at 127, the string of previously received characters is treated as a command packet 60 (see FIG. 4). The checksum 54 is verified first at 128—if it is valid, and the command 60 is valid as well, it is processed at 130, otherwise the ECU 14 sends a response—a status packet 62 indicating a problem (either invalid checksum 129, or invalid command).

If there are no characters coming (which is the case in most of the time), the microcontroller 20 performs other tasks, including: resetting the watchdog timer 131, making event log entries 132, processing $3^{rd}$ key-fob button configuration changes 133, enabling the power saving mode 134, voltage and temperature measurements, and charging setup 135, and checking for problems in diagnostic mode 136.

Figure 14:
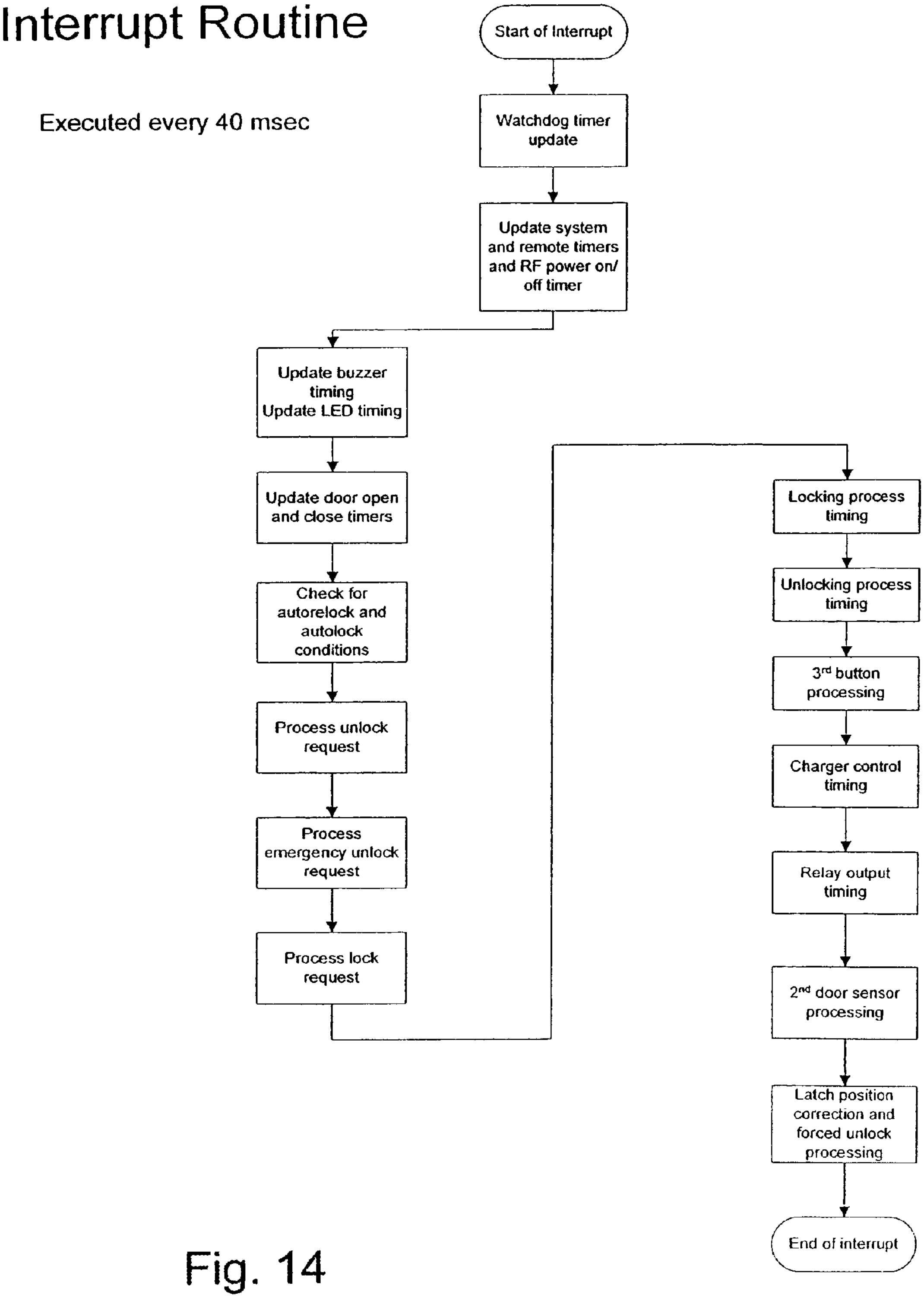
FIG. 14 represents a flow chart of the timer interrupt routine executed every 40 msec.

All timing related tasks, as well as processing lock and unlock requests, position corrections, and the $2^{nd}$ door sensor are being done by a 40 msec interrupt routine (FIG. 14). All timers are incremented every 40 msec and compared to previously set values for a particular task to happen. When the comparison is successful, the task is executed. Described here is one of many ways of accomplishing timing related tasks. Examples of used herein timers include: a watchdog timer 140, system and remote timers 141, buzzer 17 and LED timers 142, door timers 143, a locking process timer 148, a unlocking process timer 149, a charger control timer 151, and relay output timers 152. Examples of processing tasks include: processing autolock and autorelock conditions 144, lock request 147, unlock request 145, emergency unlock request 146, $3^{rd}$ key-fob button 150, $2^{nd}$ door sensor 153, latch 9 position correction and forced unlock 154. Interrupt frequency may be different, and tasks could be designed to be time related, event related, or both ways.

Figure 15:
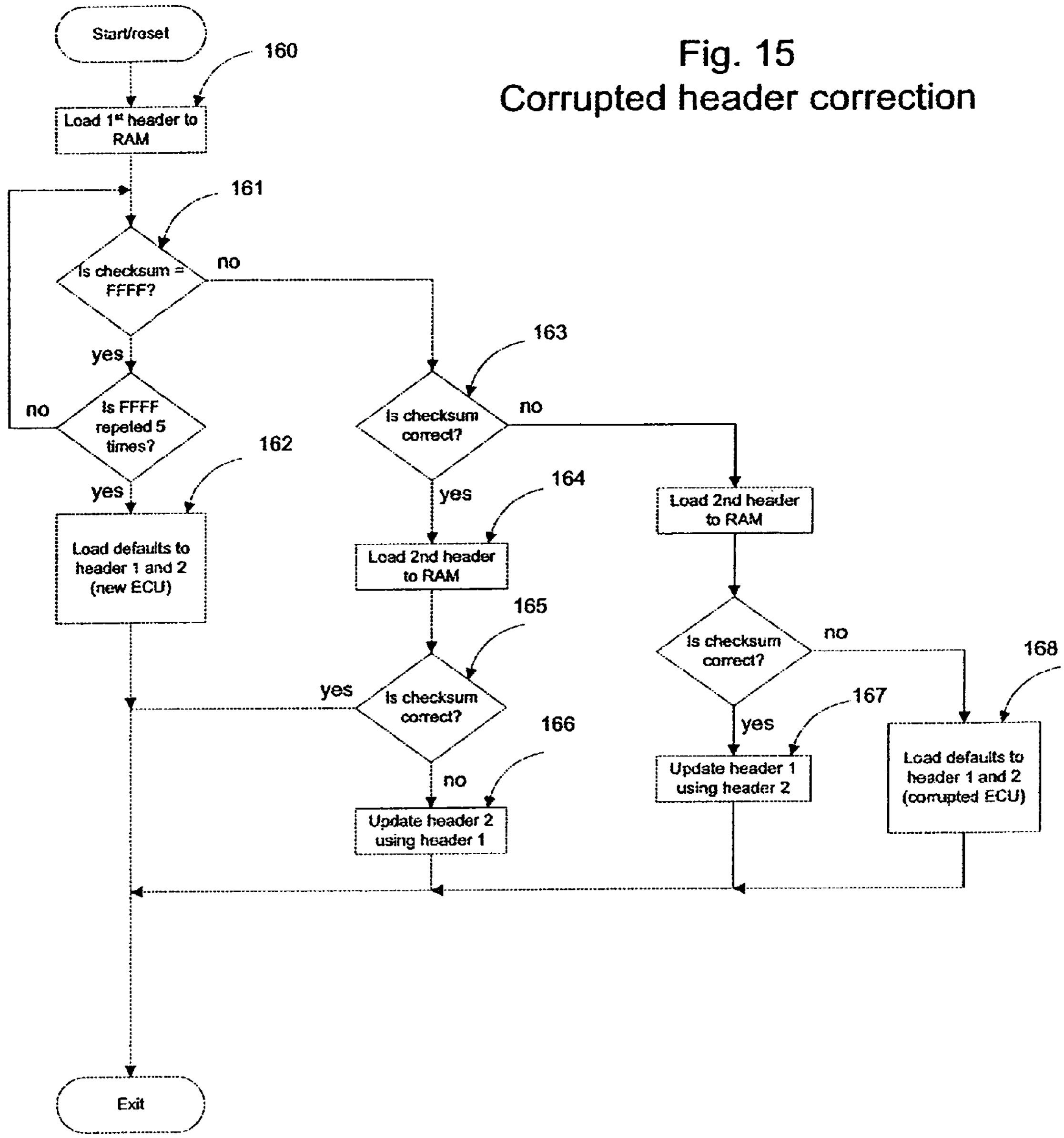
FIG. 15 is a flow chart representing corrupted header correction.

All commands and tasks are executed to perform efficiently the job required. The security system reliability and ability to perform its tasks, even when there is a failure detected in the system, is essential. The user needs to be able to rely on locking and unlocking ability all the time. One possible failure mode is when a memory 22 holding the system configuration 77, passwords, calibration offsets, and pointers to event log memory 22 gets corrupted. This memory 22 area, also called a header, is duplicated and also held in a different location. The second header (also called a redundant header) in normal operation is exactly the same as the first one. If a corruption happens to one header, the remaining one is used for repair. FIG. 15 describes the correction process. When the ECU 14 determines that a header may be corrupted, it generates a reset. Any time the reset happens, the correction process routine is executed to make sure both headers are correct. First, during initialization process, the $1^{st}$ header is loaded to microcontroller's 20 RAM at 160. At 161 it is checked if it contains all hexadecimal FF's, an indication that this is a brand new ECU 14, never configured for operation. If the ECU 14 is determined to be new, both headers are loaded at 162 and the process ends. If it is not a new ECU 14, the $1^{st}$ header's check sum is verified at 163. If it is correct, the second header is loaded at 164 and its check sum verified at 165. If any of them is found corrupted, it is fixed using the good header at 166 and 167. If both headers are corrupted at 168, the ECU 14 is still functional, however its functionality is limited and the user must use default passwords. In this case, events cannot be stored or retrieved.

Figure 16:
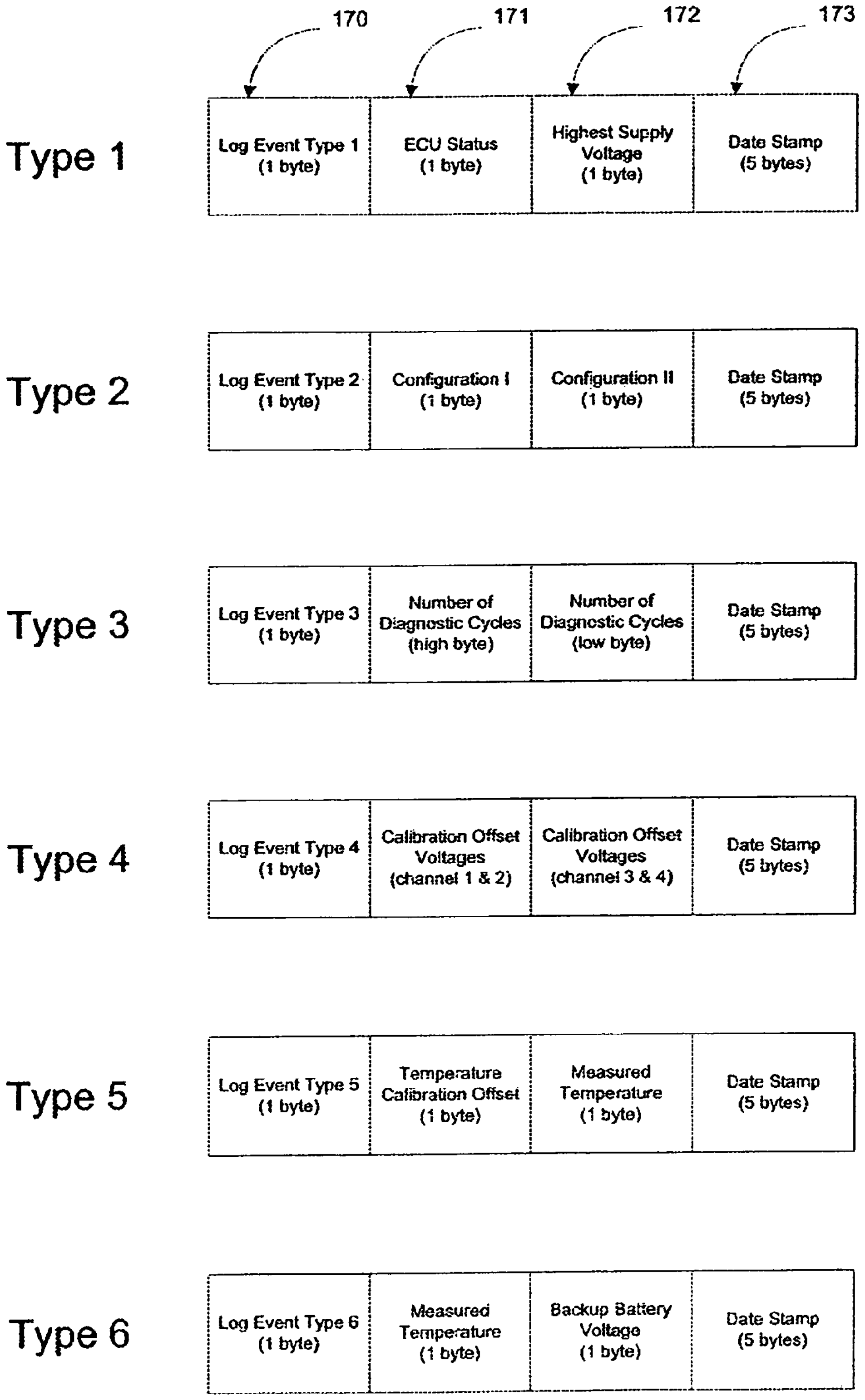
FIG. 16 represents different types of log entries.

If the EEPROM memory 22 is functional, when different events happen, they are recorded into an event memory 22. In order to utilize the event memory 22 efficiently, there may be several different types of events. A different number of bytes may be used to store each event, depending on the implementation and data needed to be stored. In one embodiment shown in FIG. 16, each event uses 8 bytes, and there are 6 types of events. All events include an event type byte 170, 2 data bytes 171 and 172, and a time stamp (5 bytes) 173. Most of the events are type 1, which uses data bytes to record the ECU 14 status and the highest supply voltage—examples include: locking, unlocking, and programming RF key-fob memory. The events of type 2 include resets and configuration 77 changes, where both data bytes are used to store configuration. Type 3, 4, and 5 events are used during the initial setup and for diagnostics to record calibration offsets and number of security device 10 diagnostic cycles. A type 6 event is used to record the current temperature from the temperature sensor 29 and the backup battery 16 voltage. There is no limitation to number of types of events to use.

Figure 17:
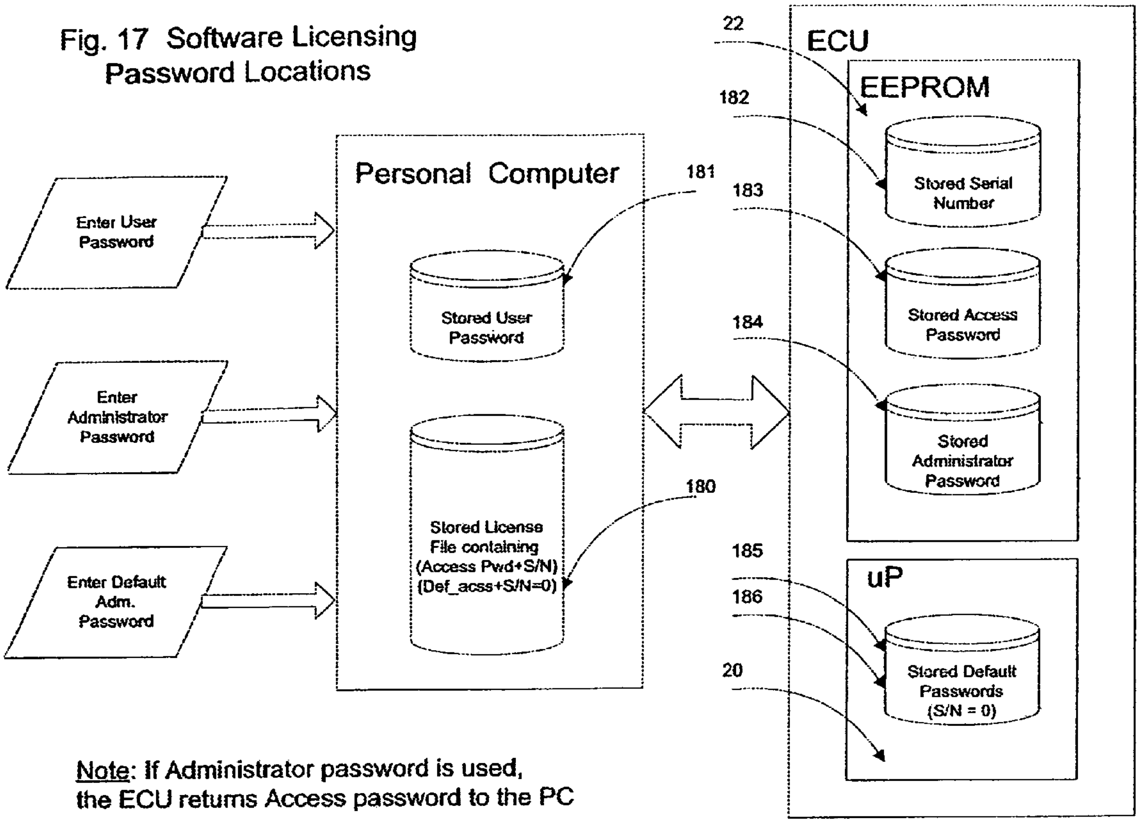
FIG. 17 shows where passwords and software license files are stored.

In one embodiment, in order to access the ECU 14, the user must have a valid software license. Licenses for different ECU's are stored in a license file. FIG. 17 shows physical locations of the license file 180, serial number 182, and all passwords (Access 183, Administrator 184, User 181, Default Access 185 and Administrator 186). Each license file 180 contains encrypted pairs of each ECU's serial number 182 and an associated password, called the Access password 183. In addition, the license file 180 contains default information: a serial number 0 and a default Access password 185 assigned for the user by the supplier. The initially supplied license file 180 contains all serial numbers 182 of the security systems purchased by the user and one common Access password 183 for all of them. This Access password 183 could be the same as the default Access password 185. The user is also given an Administrator password 184 and a default Administrator password 186—most likely they are initially the same, but they could be different. The user installs a communication program 19 on his PC and also installs the license file 180. The supplier always encourages the user to change the passwords during the initial installation, in order to make sure that nobody else (even the supplier) has access to the user's security systems. The Administrator password 184 is needed to change the ECU 14 passwords. When the Access password 183 is changed, the license file 180 is automatically updated on the PC used to change the password. If any other PC needs to be used, the license file 180 from the first PC needs to be transferred to that PC, otherwise the new Access password 183 stored in the ECU 14 won't match the one included in the original license 180. Any time an EEPROM memory 22 gets corrupted, the default password 185 (or 186) is needed to access that ECU 14, and the functionality is limited. A default serial number is 0, because the real serial number 182 couldn't be read form the corrupted memory 22.

There is also a User password 181 available to the user, needed to limit the access to the PC program 19 to the authorized people only. The Administrator password 184 could also be used to access the ECU 14 and the PC program 19, even if the User password 181 is not known to the administrator—he cannot change the User password 181 without knowing the old one, though. The only way to reset the User password 181 is to reinstall the PC program 19. When the Administrator password 184 is used to access the ECU 14, there is a data packet 61 returned to the PC, which includes the valid Access password 183 for that ECU 14. Then, the PC program 19 can use the obtained serial number 182 and Access password 183 to verify software license 180. If the EEPROM memory 22 is corrupted, the ECU 14 status packet 62 contains this information in the status byte 59. At this time, the PC program 19 needs to use default passwords 185 (or 186) and the serial number 0 for any ECU 14 access. The corrupted memory 22 cannot be repaired or reset in the field. The ECU 14 needs to be sent for service to the supplier.

Figure 18:
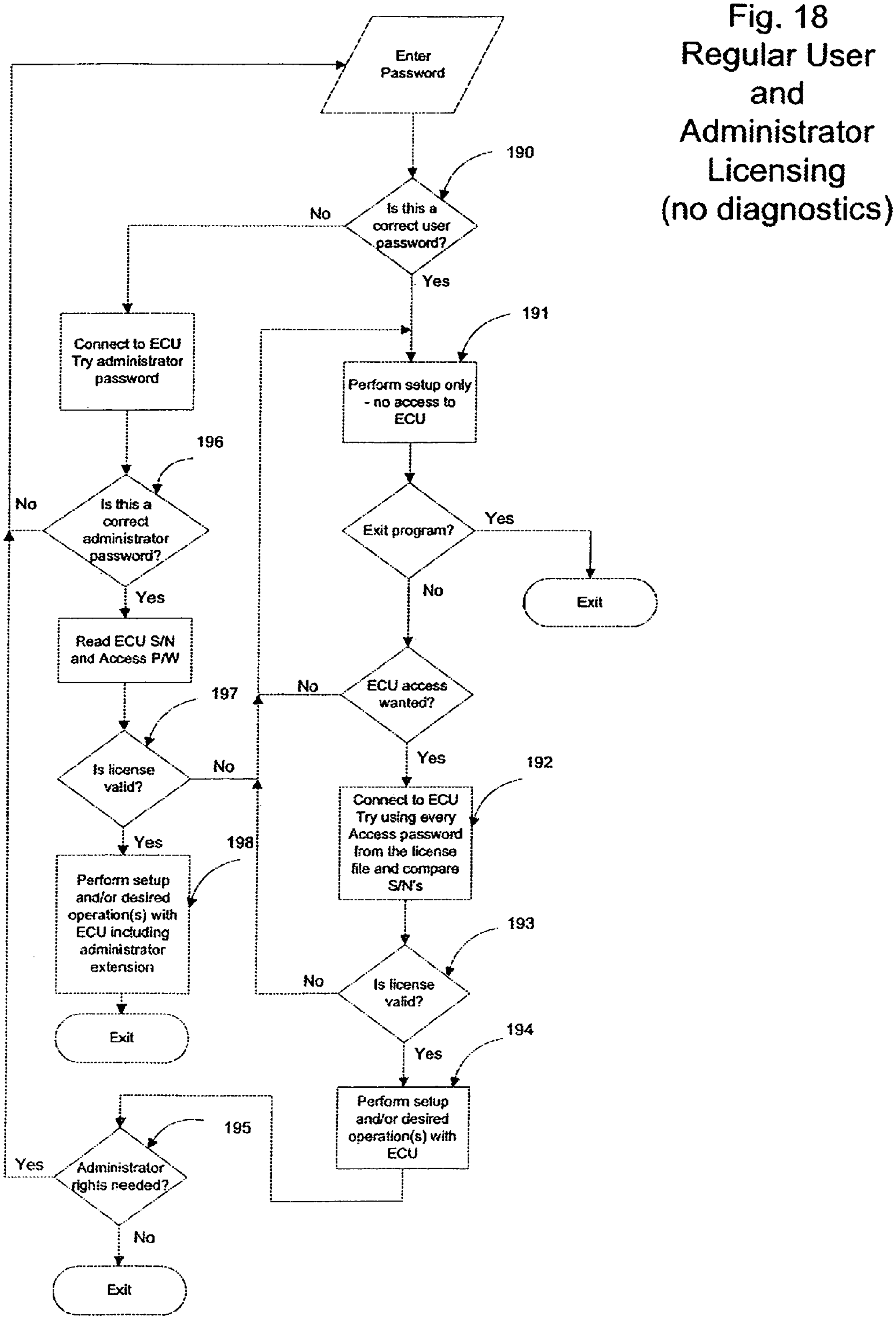
FIG. 18 is a flow chart representing how passwords and a software license are used to protect access to the security system, when diagnostic features are not enabled.

FIG. 18 shows the process used to validate User 181 and Administrator 184 passwords, if diagnostics is not enabled. The user enters a password to the PC. The PC program 19 verifies if this is a valid User password at 190. If the User password 181 is verified, the user can access the PC program 19 setup only at 191. In order to gain access to the ECU 14, the user has to "initialize" 75 the connection at 192. At this point, the software license is verified at 193 by comparing the ECU 14 serial number 182 and Access password 183 with the pairs stored in the license file 180, and the user can access the ECU 14 at 194. If additional features are needed, like changing passwords for example, the user is prompted at 195 to enter the Administrator password 184, otherwise the additional feature will be denied. If the user enters the PC program 19 with a password other than the User password 181, the PC program 19 verifies if this is a valid the Administrator password 184. If the password is verified at 196, and the Access password 183 and the serial number 182 are retrieved from the ECU 14 to verify the software license 180 compliance at 197. If everything is fine, the user is given the administrator rights at 198, otherwise only the PC program 19 setup rights 191 are available. FIG. 19 shows all available choices to users with different passwords verified in the system. If for any reason the internal EEPROM memory 22 is corrupted, the user must use default passwords 185 or 186 and his access is limited to what the default software license allows.

If diagnostics mode is enabled (FIG. 20), it is assumed that the ECU 14 is still at the supplier and it is being setup or diagnosed for problems. The user enters a password at 200. The PC program 19 verifies if this is a valid User password 181 at 201. If the User password 181 is verified, the user can access the PC program 19 setup only at 202. In order to gain access to the ECU 14, the user has to "initialize" 75 the connection at 203. At this point, the software license is verified at 204 by comparing the ECU 14 serial number 182 and Access password 183 with the pairs stored in the license file 180, and the user can access the ECU 14 at 205. If additional features are needed, like changing passwords, or running diagnostics for example, the user is prompted at 206 to enter the Administrator password 184, otherwise the additional feature will be denied. If the user enters the PC program 19 with a password other than the User password 181, the PC program verifies if this is a valid the Administrator password 184. If the password is verified at 207, the Access password 183 and the serial number 182 are still retrieved from the ECU 14, but the software license is not needed in this mode. The user is given the full administrator rights at 208. FIG. 21 shows all available choices to users with different passwords verified in the system. If for any reason the internal EEPROM memory 22 is corrupted, the user must use default passwords 185 or 186 and his access is limited, however, the administrator 186 can attempt to repair the corrupted memory 22, by writing initial default values to it, stored in the microcontroller 20 program memory.

If a brand new ECU 14 is connected to the PC program 19, the communication is not possible, because the firmware is not programmed yet to the microcontroller 20 flash memory. Therefore, in this particular case, the Administrator password 184 cannot be verified. The User password 181 is needed to start the PC program 19 and verify if the ECU 14 is responding to commands at 209. If there is no PC-ECU communication, the program 19 could load the ECU 14 firmware at 210. When the firmware is programmed and communication established at 203, either a generic license (S/N 0, default Access password 185) is verified at 204 and the user finishes its tasks in this mode, or he is prompted for the default Administrator password 186 at 206 to continue diagnostics and/or setup the passwords 183 or 184, and/or the serial number 182, and/or create the user software license file 180.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution.

What is claimed is:

1. A method of determining whether to provide a user with access to a cargo security system, comprising the steps of:

entering a user password for verification by a computing device program;

opening a stored license file of the computing device program and reading a first data pair including a first serial number and a first access password;

attempting to find a data pair match:

using the first access password of the computing device to send a first request command to an electronic control unit to verify the first serial number, if the electronic control unit confirms the first serial number matches the first access password, defining a data pair match, communication is established between the computing device and the electronic control unit;

using a second data pair from the stored license file to verify a second serial number, if the electronic control unit rejects the first request, and if the electronic control unit confirms the second serial number matches a second password, a data pair match has successfully occurred and communication is established between the computing device and the electronic control unit; and continuing this process until a data pair match has successfully occurred and communication is established between the computing device and the electronic control unit; and indicating an error message if no data pair matching has occurred, whereby communication between the computing device and electronic control unit has failed.

2. A method of determining whether to provide a user with access to a cargo security system, comprising the steps of:

entering an administrator password for verification by a program in a computing device;

sending a request command from the program to an electronic control unit to verify the administrator password, and if confirmed an access password is returned to the program;

opening the computing device program license file and confirming that the provided access password is included;

attempting to find a data pair match:

obtaining a serial number from the electronic control unit;

comparing the access password and the serial number from the electronic control unit with data pairs stored in the license file;

establishing communication between the computing device and the electronic control unit if a data pair matching has occurred;

providing administrator privileges to a user; and indicating an error message if no data pair matching has occurred, whereby communication between the computing device and electronic control unit has failed.

3. A method of determining whether to provide a user with access to a cargo security system, the method comprising the steps of:

establishing a communication link with an electronic control unit of the cargo security system;

receiving input from the user;

determining whether the user is authorized to access the electronic control unit through utilization of the user input;

validating that a computing device is authorized to access the electronic control unit if the user is authorized to access the electronic control unit, comprising the steps of:

storing a first data set in the computing device, the first data set comprising a license file including a serial number and an access password;

receiving a second data set from the electronic control unit, and determining whether the first data set matches the second data set; and providing the user with access to a predetermined number of electronic control unit functions if both the user and the computing device are authorized to access the system.

4. The method of claim 3, wherein the step of determining whether the user is authorized to access the electronic control unit comprises:

storing a user password in the computing device, determining whether the user input matches the user password, and providing the user with access to a first set of functions if the user input matches the user password.

5. The method of claim 3, further comprising:

receiving additional user input requesting access to an administrator set of functions, receiving an administrative password input from the user, requesting an administrative password verification from the electronic control unit, determining whether the administrative password input matches a stored administrative password.

6. The method of claim 3, wherein the step of determining whether the user is authorized further comprises:

requesting an administrative password verification from the electronic control unit if the user input does not match the user password; and determining whether the user input matches the administrative password.

7. The method of claim 6, wherein the step of providing the user with access comprises:

providing the user with access to an administrator set of functions if the user input matches the administrative password.

8. The method of claim 3, wherein the step of determining whether the user is authorized further comprises:

requesting a default password verification from the electronic control unit if the user input does not match the user password; and determining whether the user input matches the default password.

9. The method of claim 8, wherein the step of providing the user with access comprises:

providing the user with access to a limited set of default functions if the user input matches the default password.

10. The method of claim 3, wherein the step of receiving the second data set comprises:

sending a command packet from the computing device to the electronic control unit;

receiving a data packet that includes an electronic control unit serial number; and receiving a status packet, wherein the status packet indicates the status of the execution of the command packet.

11. The method of claim 3, wherein the step of providing the user with access to a second set of functions comprises:

providing the user with the ability to modify a license or a password relating to the cargo security system.

12. A method of determining whether to provide a user with access to a cargo security system, the method comprising the steps of:

establishing a communication link with an electronic control unit of the cargo security system;

receiving input from the user;

determining whether the user is authorized to access the electronic control unit through utilization of the user input;

validating that the computing device is authorized to access the electronic control unit if the user is authorized to access the electronic control unit, comprising the steps of:

storing a first data set in the computing device, the first data set comprising a license file including a serial number and an access password;

receiving a second data set from the electronic control unit, and determining whether the first data set matches the second data set;

providing the user with access to a predetermined number of electronic control unit functions if both the user and the computing device are authorized to access the system;

receiving a command from the user to place the electronic control unit in a diagnostic mode, requesting an administrative password from the user, determining whether the user input matches the administrative password, and providing the user with access to a second set of functions, including electronic control unit set up and diagnostic functions if the user input matches the administrative password.

13. A method of determining whether to provide a user with access to a cargo security system, comprising the steps of:

entering an administrator password for verification by a program in a computing device;

sending a request command from the program to an electronic control unit to verify the administrator password, and if confirmed an access password is returned to the program;

opening the computing device program license file and confirming that a provided access password is included; and attempting to find a data pair match, by:

obtaining a serial number from the electronic control unit;

comparing the access password and the serial number from the electronic control unit with data pairs stored in the license file;

establishing communication between the computing device and the electronic control unit if a data pair matching has occurred; and providing administrator privileges to a user, by including at least one of the following steps of:

allowing loading and updating of a firmware of the electronic control unit;

allowing access passwords to be written to and changed in a memory of the electronic control unit and when changed, updating a software license file which includes access passwords;

allowing the administrator to save the updated license to computer media to be transferred to other computing devices; and requiring all computing devices to use the updated license file, thereby eliminating the users without the new license.

* * * * *